United States Patent
Park et al.

(10) Patent No.: US 10,582,432 B2
(45) Date of Patent: Mar. 3, 2020

(54) COMMUNICATIONS FOR NETWORK SLICING USING RESOURCE STATUS INFORMATION

(71) Applicant: Comcast Cable Communications, LLC, Philadelphia, PA (US)

(72) Inventors: Kyungmin Park, Arlington, VA (US); Esmael Hejazi Dinan, Herndon, VA (US); Alireza Babaei, Ashburn, VA (US); Hyoungsuk Jeon, Oakton, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/971,815

(22) Filed: May 4, 2018

(65) Prior Publication Data

US 2018/0324663 A1 Nov. 8, 2018

Related U.S. Application Data

(60) Provisional application No. 62/501,478, filed on May 4, 2017.

(51) Int. Cl.
| | |
|---|---|
| *H04W 36/00* | (2009.01) |
| *H04W 36/08* | (2009.01) |
| *H04W 36/38* | (2009.01) |
| *H04W 36/22* | (2009.01) |
| *H04W 16/02* | (2009.01) |
| *H04W 92/12* | (2009.01) |
| *H04W 88/08* | (2009.01) |
| *H04W 36/14* | (2009.01) |

(52) U.S. Cl.
CPC ....... *H04W 36/08* (2013.01); *H04W 36/0069* (2018.08); *H04W 36/0083* (2013.01); *H04W 36/22* (2013.01); *H04W 36/38* (2013.01); *H04W 16/02* (2013.01); *H04W 36/14* (2013.01); *H04W 88/085* (2013.01); *H04W 92/12* (2013.01)

(58) Field of Classification Search
CPC ..... H04W 36/08; H04W 36/12; H04W 36/14; H04W 36/18; H04W 36/30
USPC ................. 455/436, 437, 438, 453
See application file for complete search history.

(56) References Cited

U.S. PATENT DOCUMENTS

| | | | |
|---|---|---|---|
| 2016/0352645 A1 | 12/2016 | Senarath et al. | |
| 2016/0353268 A1 | 12/2016 | Senarath et al. | |

(Continued)

FOREIGN PATENT DOCUMENTS

| | | |
|---|---|---|
| WO | 2017074486 A1 | 5/2017 |
| WO | 2017171598 A1 | 10/2017 |

(Continued)

OTHER PUBLICATIONS

Qian (Clara) Li et al., "An end-to-end network slicing framework for 5G wireless communication systems", Aug. 2016, Intel Corporation, USA.

(Continued)

*Primary Examiner* — Temica M Beamer
(74) *Attorney, Agent, or Firm* — Banner & Witcoff, Ltd.

(57) ABSTRACT

Systems, apparatuses, and methods are described for wireless communications. A base station may receive resource status information. The base station may use the resource status information for serving one or more network slices for a wireless device.

26 Claims, 28 Drawing Sheets

(56) References Cited

U.S. PATENT DOCUMENTS

| | | | |
|---|---|---|---|
| 2016/0353367 A1 | 12/2016 | Vrzic et al. | |
| 2017/0086118 A1 | 3/2017 | Vrzic | |
| 2018/0124661 A1* | 5/2018 | Tsai | H04W 24/10 |
| 2018/0184415 A1* | 6/2018 | Rong | H04W 48/18 |

FOREIGN PATENT DOCUMENTS

| | | |
|---|---|---|
| WO | 2017173259 A1 | 10/2017 |
| WO | 2018017132 A1 | 1/2018 |

OTHER PUBLICATIONS

3GPP TS 23.501 V0.4.0 (Apr. 2017), 3rd Generation Partnership Project; Technical Specification Group Services and System Aspects; System Architecture for the 5G System; Stage 2 (Release 15).

R2-1702529 3GPP TSG-RAN WG2 #97bis, Spokane, USA, Apr. 3-7, 2017, Source: Xiaomi, Title: Visibility of Slicing to UE.

R2-1702539 3GPP TSG-RAN2 #97bis, Spokane, USA, Apr. 3-7, 2017, Source: OPPO, Title: Discussion on Mobility Issues of Network Slicing.

R2-1702551 3GPP TSG-RAN WG2 #97bis, Spokane, USA, Apr. 3-7, 2017, Source: Ericsson, Title: Signalling aspects of network slicing.

R2-1702552 Tdoc 3GPP TSG-RAN WG2 #97bis, Spokane, USA, Apr. 3-7, 2017, Source: Ericsson, Title: Slice availability.

R2-1702553 Tdoc 3GPP TSG-RAN WG2 #97bis, Spokane, USA, Apr. 3-7, 2017, Source: Ericsson, Title: Access Control and Resource Isolation for Slicing.

R2-1702554 Tdoc 3GPP TSG-RAN WG2 #97bis, Spokane, USA, Apr. 3-7, 2017, Source: Ericsson, Title: Is UE AS slice agnostic or not?

R2-1702588 3GPP TSG-RAN WG2 #97bis, Spokane, USA, Apr. 3-7, 2017, Source: Huawei, HiSilicon, Title: UE Awareness of Network Slice.

R2-1702589 3GPP TSG-RAN WG2 #97bis, Spokane, USA, Apr. 3-7, 2017, Source: Huawei, HiSilicon, Title: RRC Support for Network Slicing.

R2-1702590 3GPP TSG-RAN WG2 #97bis, Spokane, USA, Apr. 3-7, 2017, Source: Huawei, HiSilicon, Title: Network Slice Selection Assistance Information over RRC.

R2-1702843 3GPP TSG-RAN WG2 #97bis, Spokane, USA, Apr. 3-7, 2017, Source: ZTE, ZTE Microelectronics, Title: Consideration on the NW slice in RAN.

R2-1702969 3GPP TSG-RAN WG2 #97bis, Spokane, USA, Apr. 3-7, 2017, Source: Coolpad, Title: Discussion on UE RRC modeling to support multiple slices per-UE.

R2-1703101 3GPP TSG-RAN WG2 #97bis, Spokane, USA, Apr. 3-7, 2017, Source: CATT, Title: Slice visibility to UE AS.

R2-1703337 3GPP TSG-RAN WG2 #97bis, Spokane, USA, Apr. 3-7, 2017, Source: Samsung, Title: Review on Network Slicing.

R2-1703343 3GPP TSG-RAN WG2 #97bis, Spokane, USA, Apr. 3-7, 2017, Source: Samsung, Title: Slice Information in RRC.

R2-1703762 3GPP TSG-RAN WG2 #97bis, Spokane, USA, Apr. 3-7, 2017, Source: SA3, Title: Reply LS on privacy of registration and slice selection information (revision of Tdoc 53170902 in Busan, Korea from Mar. 27-31, 2017).

R3-170675 3GPP TSG-RAN WG3 #95, Athens, Greece, Feb. 13-17, 2017, Source: Ericsson, Title: Clarifications on the use of NSSAI in Network Slicing.

R3-170677 3GPP TSG-RAN WG3 #95, Athens, Greece, Feb. 13-17, 2017, Source: Ericsson, Title: Mobility and Mapping of NW Slices.

R3-171012 3GPP TSG-RAN WG3 #95bis, Spokane, USA, Apr. 3-7, 2017, Source: CATT, Title: Discussion on Slice-aware mobility.

R3-171029 3GPP TSG-RAN WG3 #95bis, Spokane, USA, Apr. 3-7, 2017, Source: ZTE, Title: NW Slice Availability Handling Approaches during Mobility.

R3-171047 3GPP TSG-RAN WG3 #95bis, Spokane, USA, Apr. 3-7, 2017, Source: Samsung, Title: RAN supporting Network Slicing.

R3-171097 3GPP TSG-RAN WG3 #95bis, Spokane, USA, Apr. 3-7, 2017, Source: Qualcomm Incorporated, Title: TP for network slicing description.

R3-171115 3GPP TSG-RAN WG3 #95bis, Spokane, USA, Apr. 3-7, 2017, Source: Nokia, Alcatel-Lucent Shanghai Bell, Title: Use of slice ID and NSSAI.

R3-171116 3GPP TSG-RAN WG3 #95bis, Spokane, USA, Apr. 3-7, 2017, Source: Nokia, Alcatel-Lucent Shanghai Bell, Title: Connected mode mobility with slicing.

R3-171117 3GPP TSG-RAN WG3 #95bis, Spokane, USA, Apr. 3-7, 2017, Source: Nokia, Title: LS on slice re-mapping during connected mode mobility.

R3-171128 3GPP TSG-RAN WG3 #95bis, Spokane, USA, Apr. 3-7, 2017, Source: LG Electronics Inc., Title: Discussion on slice availability during mobility.

R3-171129 3GPP TSG-RAN WG3 #95bis, Spokane, USA, Apr. 3-7, 2017, Source: LG Electronics Inc., Title: Mobility procedure considering network slice.

R3-171139 3GPP TSG-RAN WG3 #95bis, Spokane, USA, Apr. 3-7, 2017, Source: Ericsson, Title: RAN aspects of NW slicing in Stage 2 specifications.

R3-171140 3GPP TSG-RAN WG3 #95bis, Spokane, USA, Apr. 3-7, 2017, Source: Ericsson, Title: Stage 2 aspects of CN Instance selection signalling.

R3-171141 3GPP TSG-RAN WG3 #95bis, Spokane, USA, Apr. 3-7, 2017, Source: Ericsson, Title: Signalling aspects of networking slicing.

R3-171142 3GPP TSG-RAN WG3 #95bis, Spokane, USA, Apr. 3-7, 2017, Source: Ericsson, Title: LS regarding RAN support for NW slicing.

R3-171143 3GPP TSG-RAN WG3 #95bis, Spokane, USA, Apr. 3-7, 2017, Source: Ericsson, Title: Slice re-mapping or removal during mobility.

R3-171144 3GPP TSG-RAN WG3 #95bis, Spokane, USA, Apr. 3-7, 2017, Source: Ericsson, Title: LS to SA2 on slices and mobility.

R3-171250 3GPP TSG-RAN WG3 #95bis, Spokane, USA, Apr. 3-7, 2017, Source: Huawei, Title: Slice Awareness of Availability during Mobility.

R3-171251 3GPP TSG-RAN WG3 #95bis, Spokane, USA, Apr. 3-7, 2017, Source: Huawi, Title: Further Discussion on Slice Re-mapping.

R3-171252 3GPP TSG-RAN WG3 #95bis, Spokane, USA, Apr. 3-7, 2017, Source: Huawei, Title: Dual Connectivity for Slicing.

R3-171351 3GPP TSG-RAN WG3 #95bis, Spokane, USA, Apr. 3-7, 2017, Source: LG Electronics Inc., Title: TP for exchange of NSSAI in Xn Setup Procedure.

R3-171353 3GPP TSG-RAN WG3 #95bis, Spokane, USA, Apr. 3-7, 2017, Source: Ericsson, Title: RAN aspects of NW slicing in Stage 2 specifications.

R3-171394 3GPP TSG-RAN WG3 #95bis, Spokane, USA, Apr. 3-7, 2017, Source: RAN3, Title: LS regarding RAN support for NW slicing.

R3-171395 3GPP TSG-RAN WG3 #95bis, Spokane, USA, Apr. 3-7, 2017, Source: Ericsson, Title: Stage 2 aspects of CN Instance selection signalling.

R3-171396 3GPP TSG-RAN WG3 #95bis, Spokane, USA, Apr. 3-7, 2017, Source: RAN WG3, Title: LS on slice re-mapping during connected mode mobility.

3GPP TS 36.423 V14.2.0 (Mar. 2017); 3rd Generation Partnership Project; Technical Specification Group Radio Access Network; Evolved Universal Terrestrial Radio Access Network (E-UTRAN); X2 application protocol (X2AP) (Release 14).

\* cited by examiner

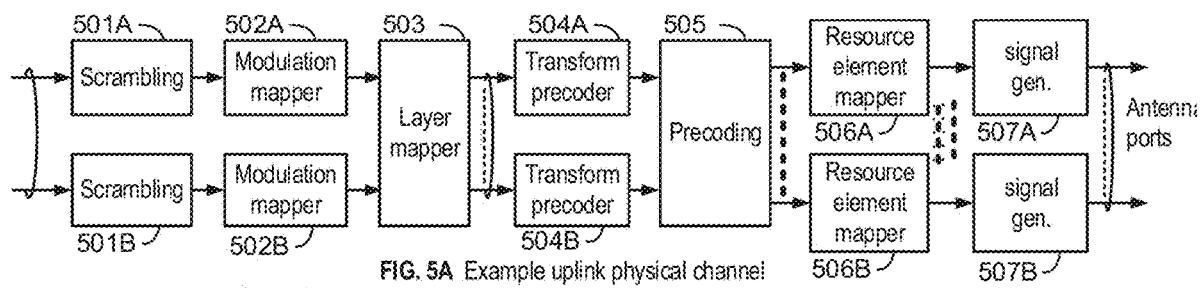
FIG. 5A Example uplink physical channel
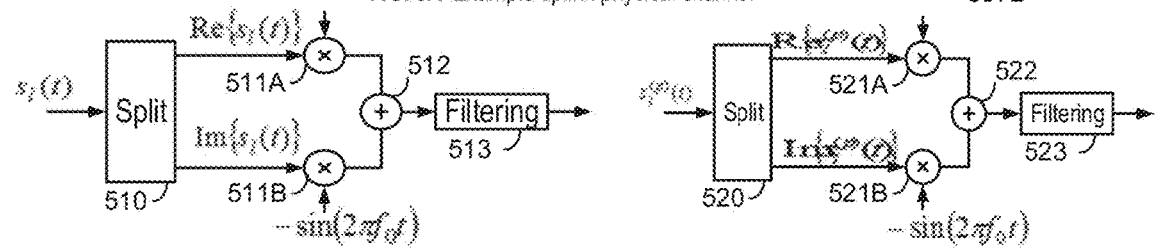
FIG. 5B Example uplink modulation
FIG. 5D Example downlink modulation
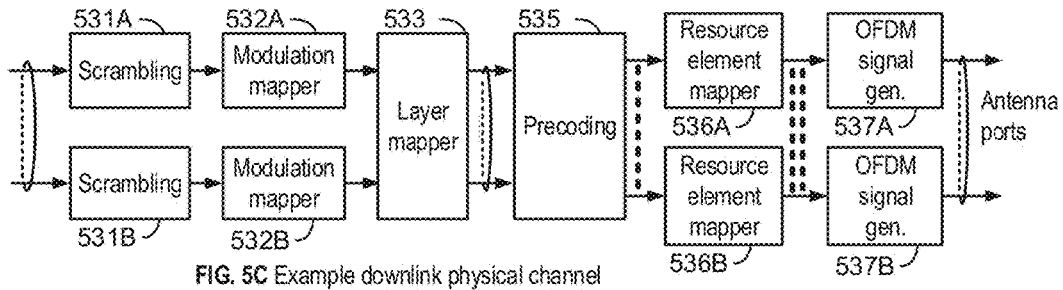
FIG. 5C Example downlink physical channel Example 1:
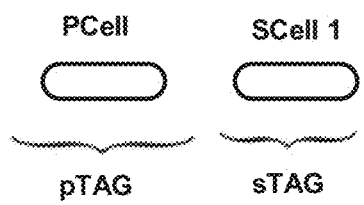
Example 2:
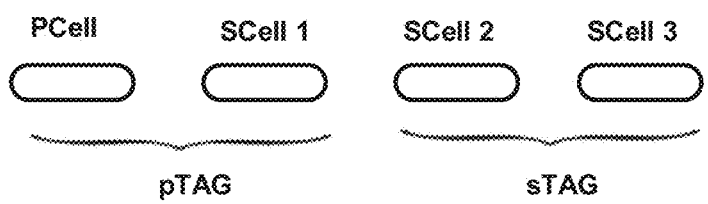
Example 3:
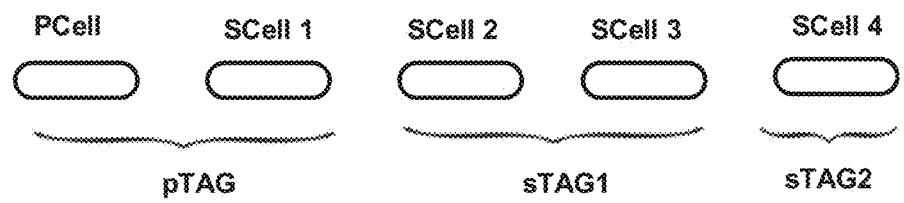
FIG. 8

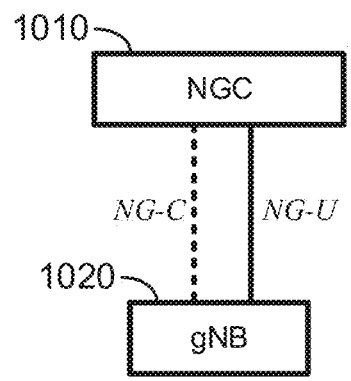
FIG. 10A gNB connected to NGC
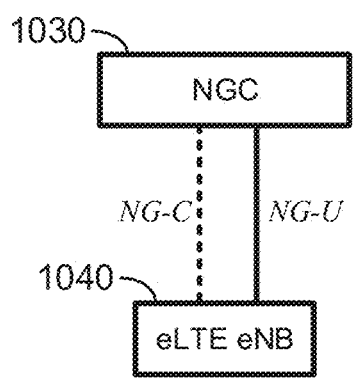
FIG. 10B eLTE eNB connected to NGC

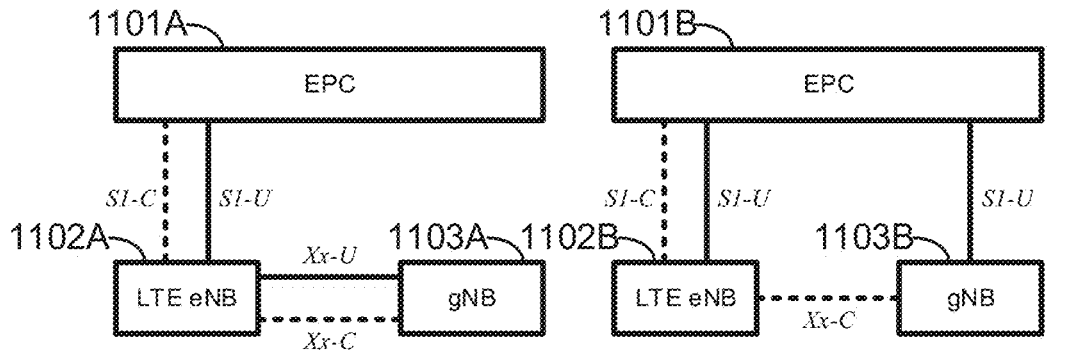

FIG. 11A LTE eNB connected to EPC with non-standalone gNB. gNB user plane connected to EPC via LTE eNB.

FIG. 11B LTE eNB connected to EPC with non-standalone gNB. gNB user plane connected to EPC directly.

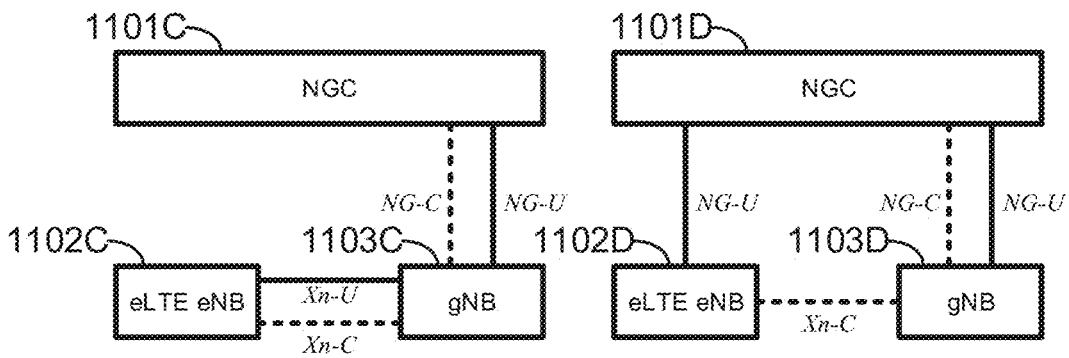

FIG. 11C gNB connected to NGC with non-standalone eLTE eNB. eLTE eNB user plane connected to NGC via gNB.

FIG. 11D gNB connected to NGC with non-standalone eLTE eNB. eLTE eNB user plane connected to NGC directly.

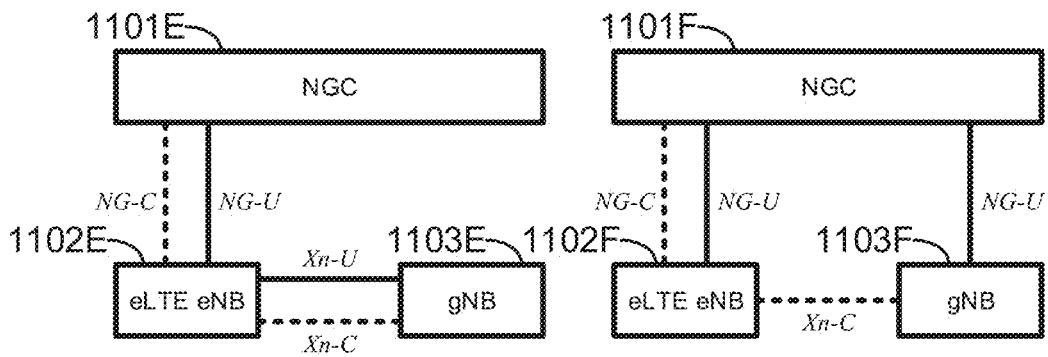

FIG. 11E eLTE eNB connected to NGC with non-standalone gNB. gNB user plane connected to NGC via eLTE eNB.

FIG. 11F eLTE eNB connected to NGC with non-standalone gNB. gNB user plane connected to NGC directly.

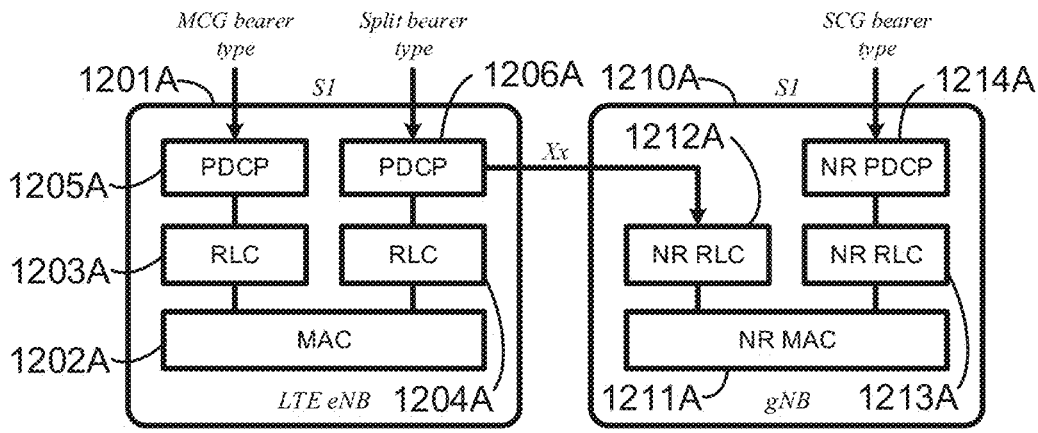
FIG. 12A Radio protocol architecture for split bearer and SCG bearer. LTE eNB connected to EPC with non-standalone gNB.
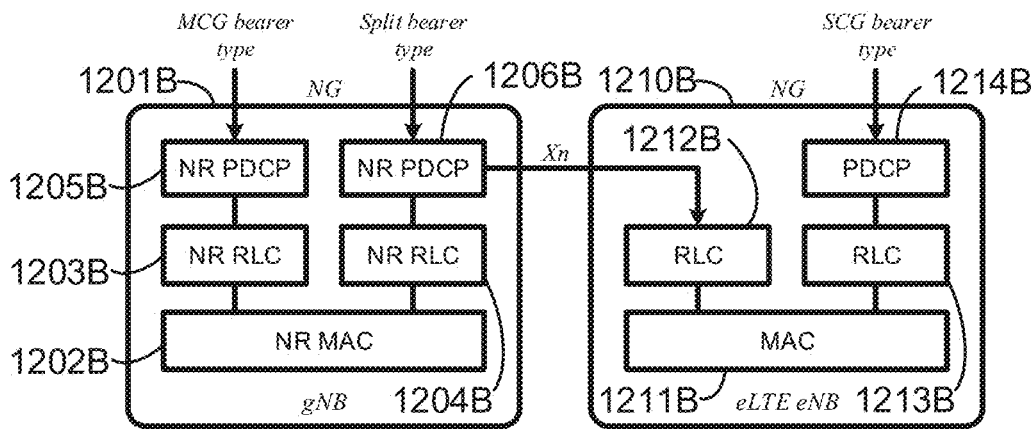
FIG. 12B Radio protocol architecture for split bearer and SCG bearer. gNB connected to NGC with non-standalone eLTE eNB.
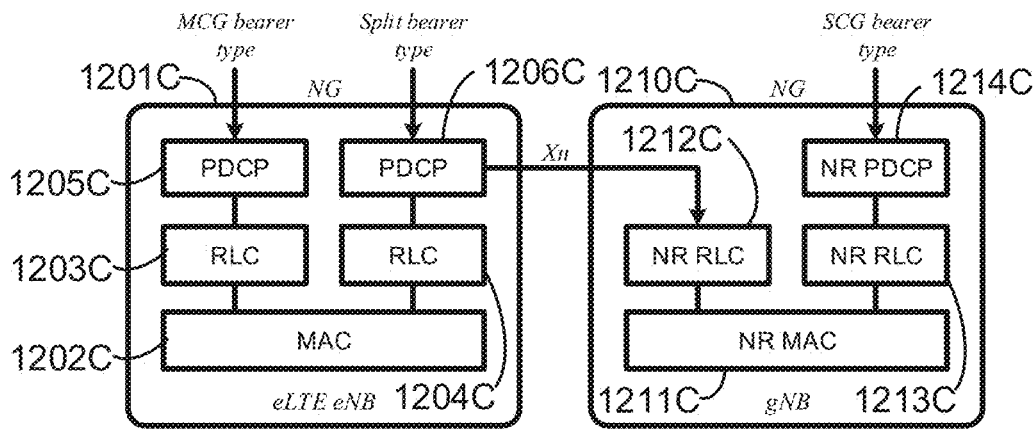
FIG. 12C Radio protocol architecture for split bearer and SCG bearer. eLTE eNB connected to NGC with non-standalone gNB.

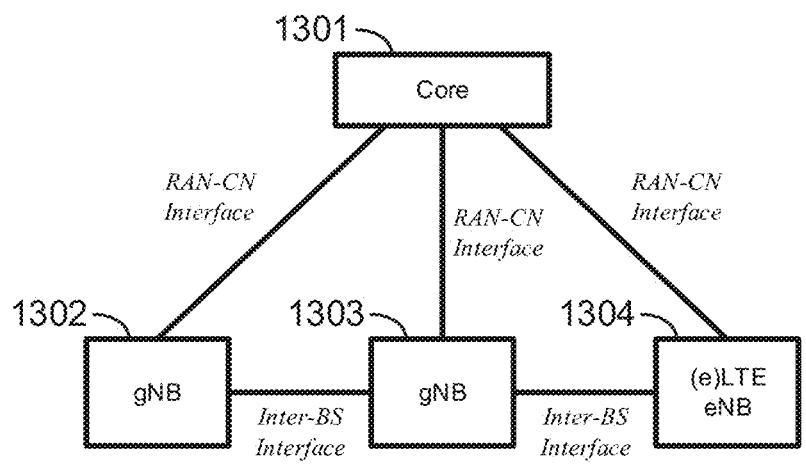
FIG. 13A Non-centralized deployment
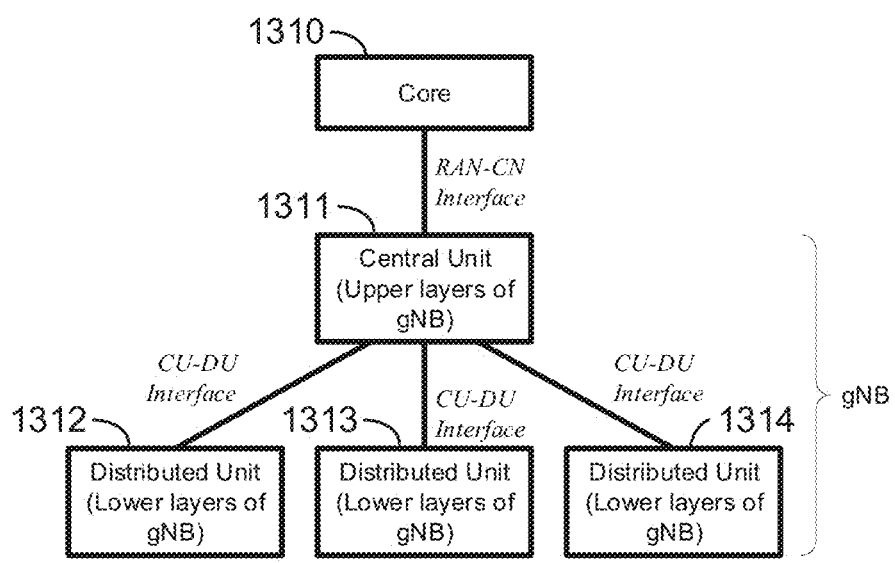
FIG. 13B Centralized deployment

COMMUNICATIONS FOR NETWORK SLICING USING RESOURCE STATUS INFORMATION

CROSS-REFERENCE TO RELATED APPLICATIONS

This application claims the benefit of U.S. Provisional Application No. 62/501,478, titled "Resource Status Information," which was filed on May 4, 2017, and which is hereby incorporated by reference in its entirety.

BACKGROUND

In wireless communications, network slicing may be used for different device or service types. If a wireless device or service requires one or more network slices, difficulties may arise in determining, e.g., for a handover procedure, a base station that may serve a required one or more network slices for the wireless device.

SUMMARY

The following summary presents a simplified summary of certain features. The summary is not an extensive overview and is not intended to identify key or critical elements.

Systems, apparatuses, and methods are described for communications associated with network slicing and/or differentiated handling of communications. A first base station may receive resource status information from one or more second base stations. The first base station may determine whether a handover, multi-connectivity activation, and/or multi-connectivity modification should be performed for serving one or more network slices for a wireless device. The first base station may use the resource status information to determine one or more second base stations for serving the one or more network slices for the wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between 5G RAN and long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment scenarios.

DETAILED DESCRIPTION

Figure 1:
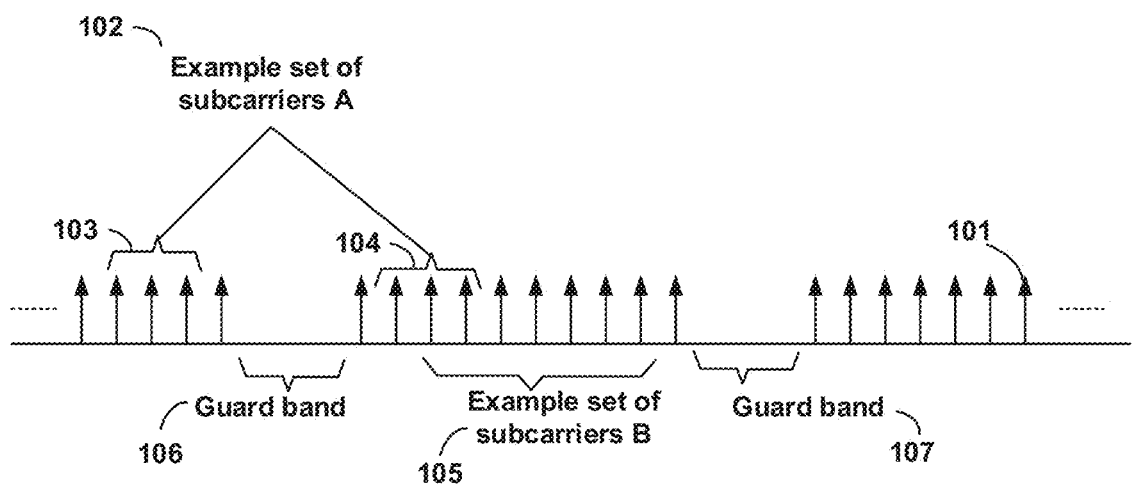
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to signal timing in a multicarrier communication systems.

The following Acronyms are used throughout the present disclosure:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example of subcarriers B 105. Carriers in a multicarrier OFDM communication system may be contiguous carriers, non-contiguous carriers, or a combination of both contiguous and non-contiguous carriers.

Figure 2:
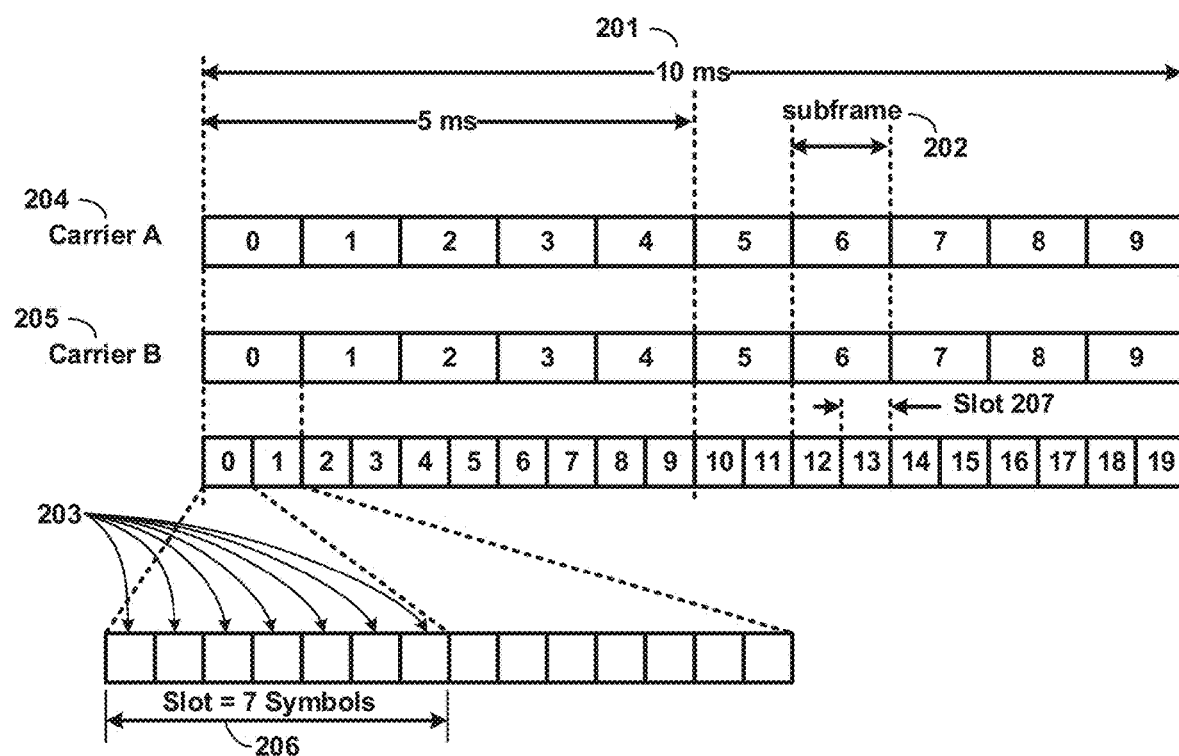
FIG. 2 shows example transmission time and reception time for two carriers in a carrier group.

FIG. 2 shows an example with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part, and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
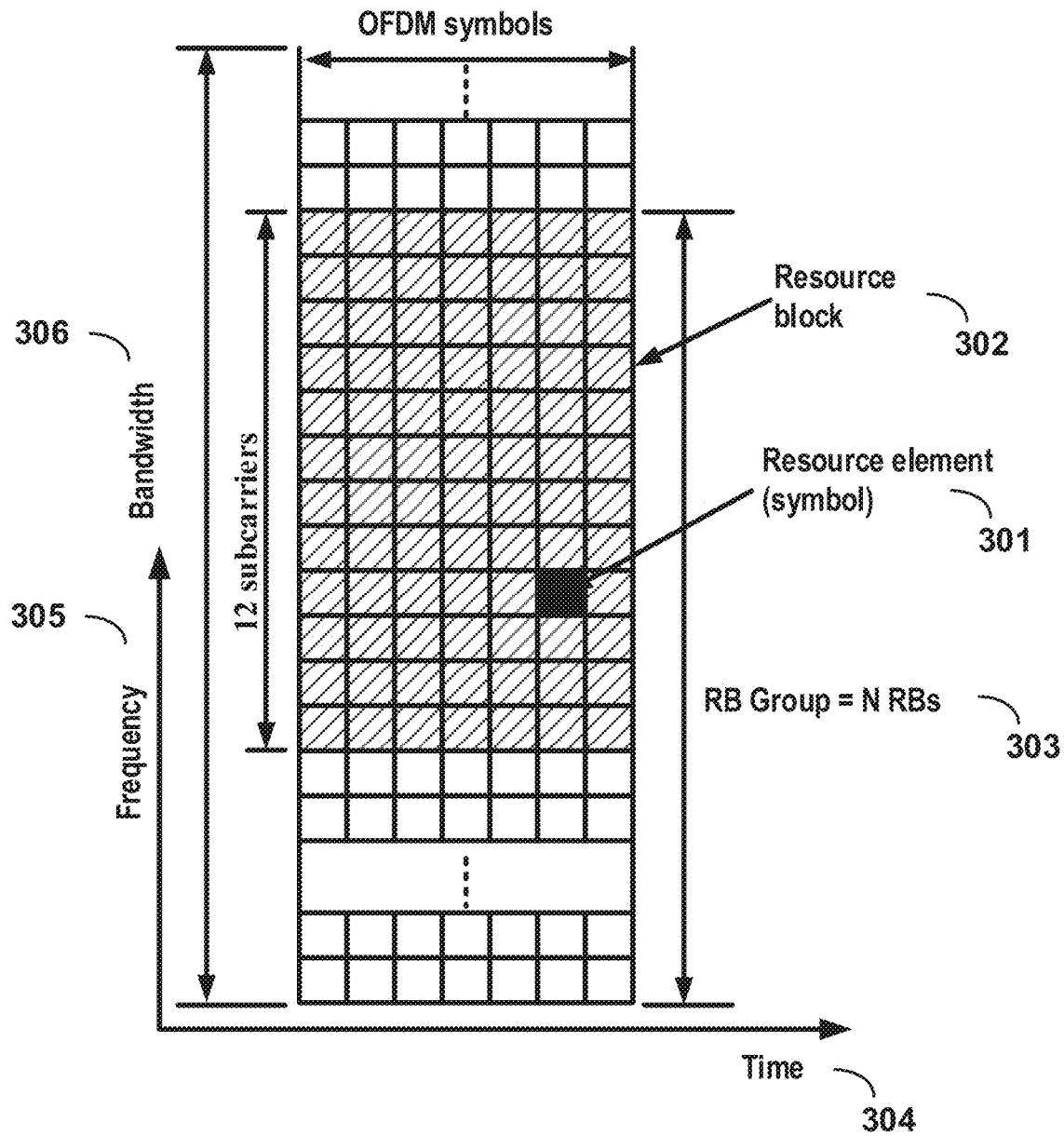
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
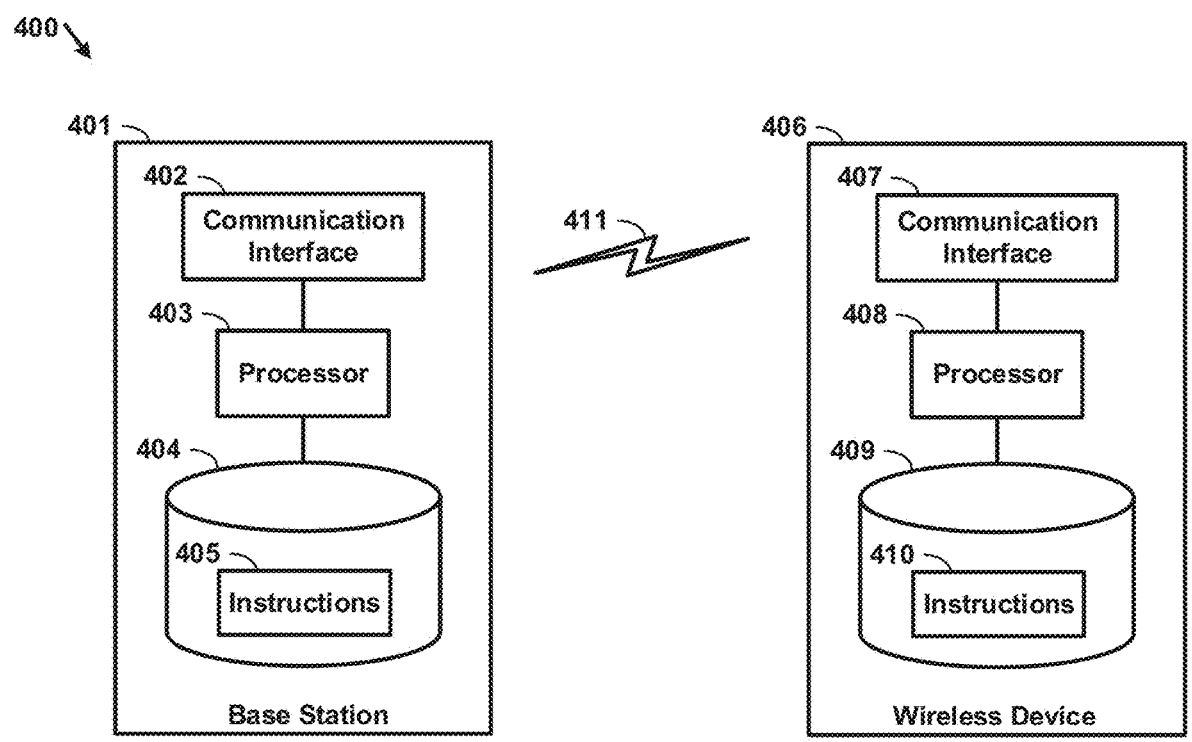
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As an example, any reference to a base station may comprise an eNB, a gNB, a computing device, or any other device, and any reference to a wireless device may comprise a UE, a handset, a mobile device, a computing device, or any other device.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise at least one of a gNB, ng-eNB, and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plan Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3$^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/ or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

Examples may be configured to operate as needed. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various examples may be applied. Therefore, it may be possible to implement examples that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. While in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

FIG. 5A, FIG. 5B, FIG. 5C, and FIG. 5D show examples for uplink and downlink signal transmission. FIG. 5A shows an example for an uplink physical channel. The baseband signal representing the physical uplink shared channel may be processed according to the following processes, which may be performed by structures described below. While these structures and corresponding functions are shown as examples, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

Example modulation and up-conversion to the carrier frequency of the complex-valued DFTS-OFDM/SC-FDMA baseband signal for each antenna port and/or the complex-valued physical random access channel (PRACH) baseband signal is shown in FIG. 5B. For example, the baseband signal, represented as $s_1(t)$, may be split, by a signal splitter 510, into real and imaginary components, $\mathrm{Re}\{s_1(t)\}$ and $\mathrm{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

An example structure for downlink transmissions is shown in FIG. 5C. The baseband signal representing a downlink physical channel may be processed by the following processes, which may be performed by structures described below. While these structures and corresponding functions are shown as examples, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

Example modulation and up-conversion to the carrier frequency of the complex-valued OFDM baseband signal for each antenna port is shown in FIG. 5D. For example, the baseband signal, represented as $s_1^{(p)}(t)$, may be split, by a signal splitter 520, into real and imaginary components, $\mathrm{Re}\{s_1^{(p)}(t)\}$ and $\mathrm{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
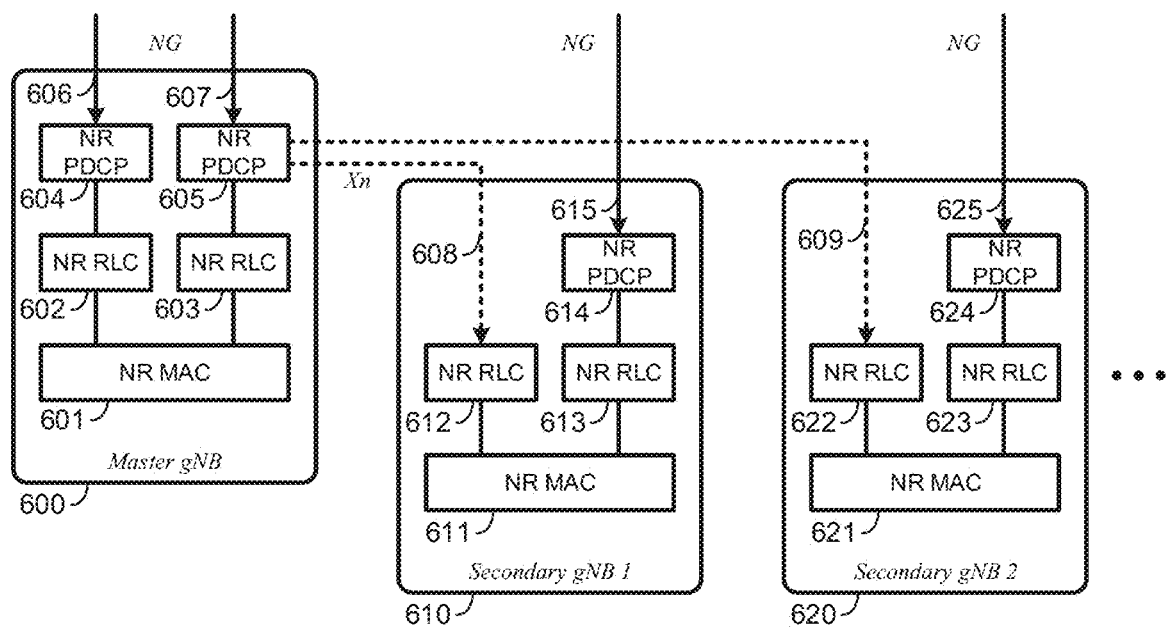
FIG. 6 shows an example protocol structure with multi-connectivity.
Figure 7:
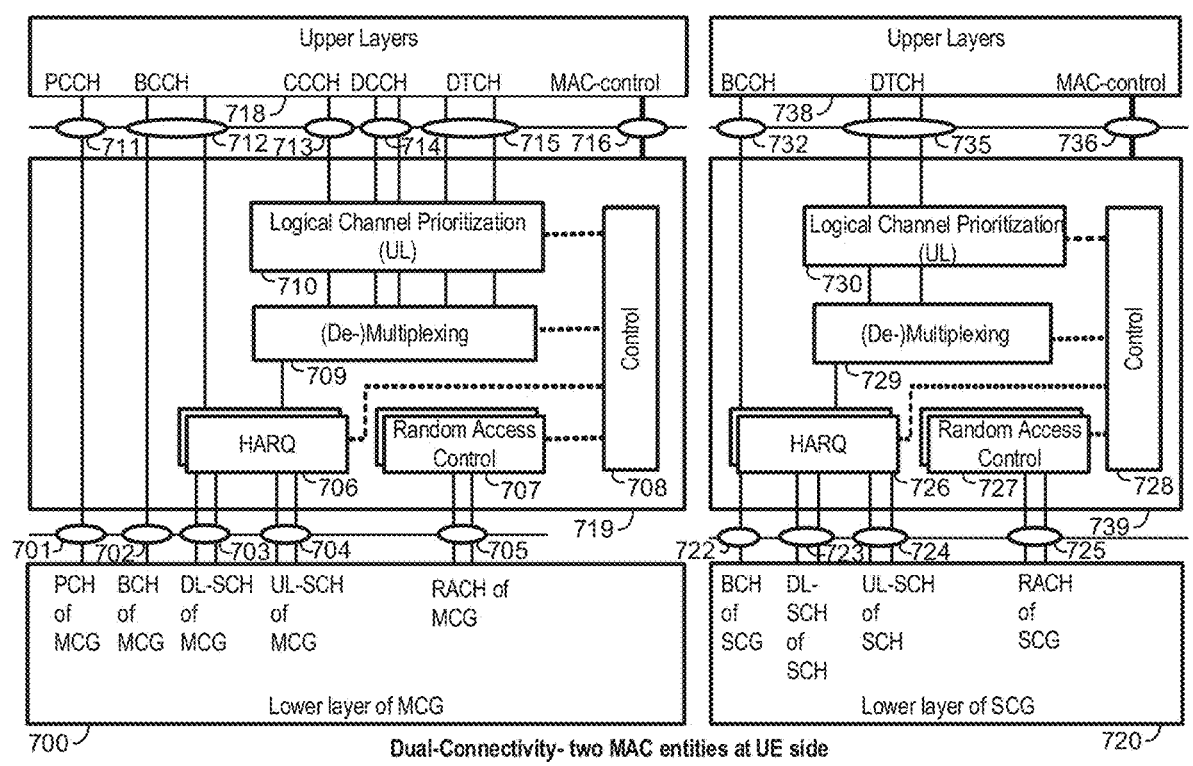
FIG. 7 shows an example protocol structure with carrier aggregation (CA) and dual connectivity (DC).

FIG. 6 and FIG. 7 show examples for protocol structures with CA and multi-connectivity. In FIG. 6, NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, with the secondary gNB 610 at layer NR RLC 612. The master gNB 600 may communicate via the interface 609, at layer NR PDCP 605, with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

In the case of multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) containing the serving cells of the master gNB, and the Secondary Cell Groups (SCGs) containing the serving cells of the secondary gNBs.

For an SCG, one or more of the following may be applied. At least one cell in the SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

With respect to the interaction between a master gNB and secondary gNBs for multi-connectivity, one or more of the following may be applied. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In the case of an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). In an example, if adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. In an example, serving cells having an uplink to which the same TA applies may correspond to serving cells hosted by the same receiver. A wireless device supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be applied to configurations with multiple sTAGs.

In an example, an eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
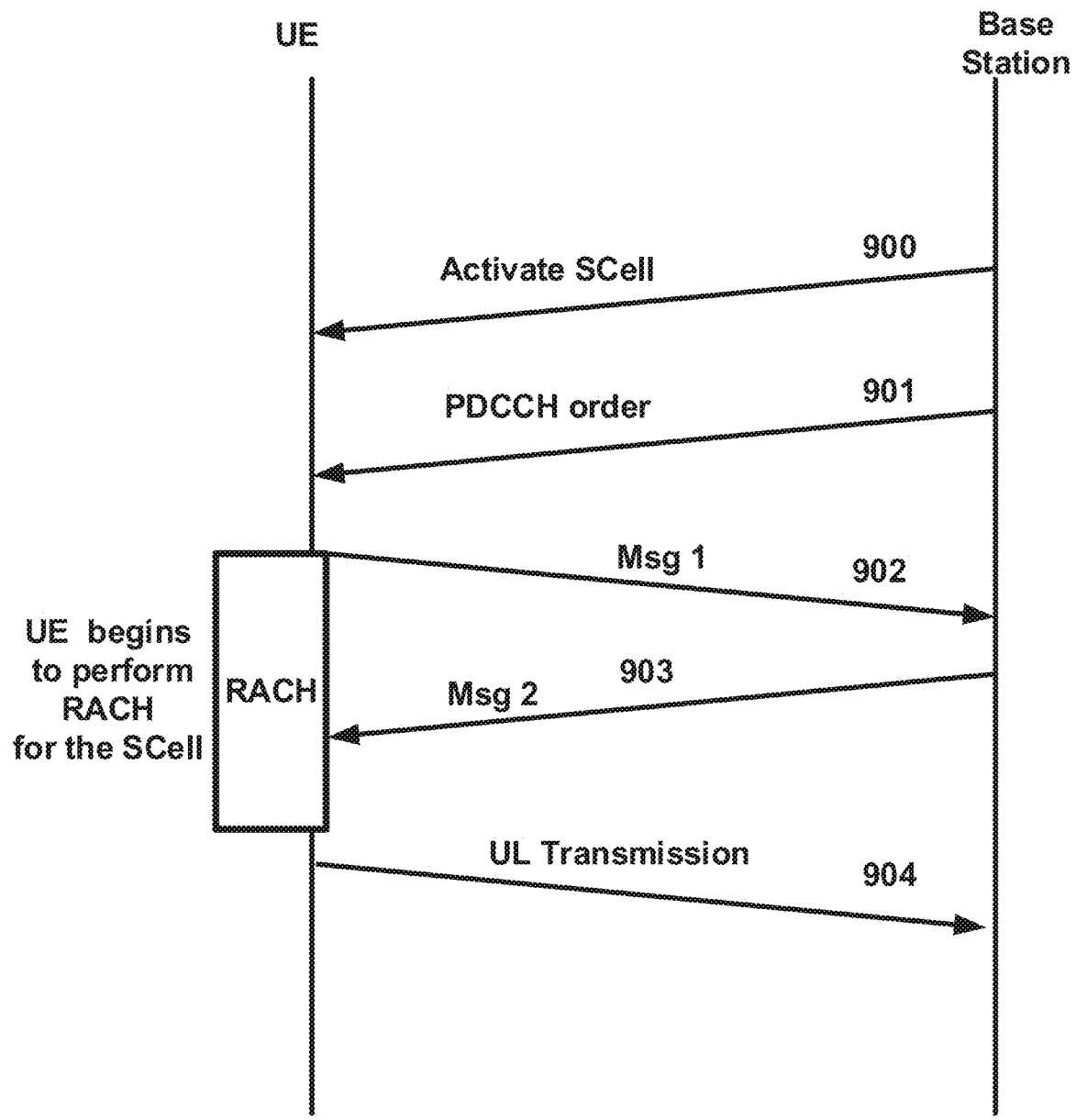
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted after the activation command 900. The wireless device may begin to perform a RACH process for the SCell, which may be initiated after receiving the PDDCH order 901. The RACH process may include the wireless device transmitting to the base station a preamble 902 (e.g., Msg1), such as a random access preamble (RAP). The preamble 902 may be transmitted in response to the PDCCH order 901. The wireless device may transmit the preamble 902 via an SCell belonging to an sTAG. In an example, preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be achieved through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and then configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). For example, in FIG. 10A, a base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, in FIG. 10B, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

In FIG. 11A and FIG. 11B, a master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

In FIG. 11C and FIG. 11D, a master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

In FIG. 11E and FIG. 11F, a master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

In FIG. 12A, an LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

In FIG. 12B, a gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

In FIG. 12C, an eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

In the case of tight interworking, the wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) containing the serving cells of the master base station, and the Secondary Cell Group (SCG) containing the serving cells of the secondary base station.

For an SCG, one or more of the following may be applied. At least one cell in the SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

With respect to the interaction between a master base station and a secondary base station, one or more of the following may be applied. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment scenarios. A core 1301 and a core 1310, in FIG. 13A and FIG. 13B, respectively, may interface with other nodes via RAN-CN interfaces. In a non-centralized deployment scenario in FIG. 13A, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In the centralized deployment scenario in FIG. 13B, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation after the Fs interface setup procedure, or the functional split option may change only in the Fs setup procedure (e.g., the functional split option may be static during operation after Fs setup procedure).

Figure 14:
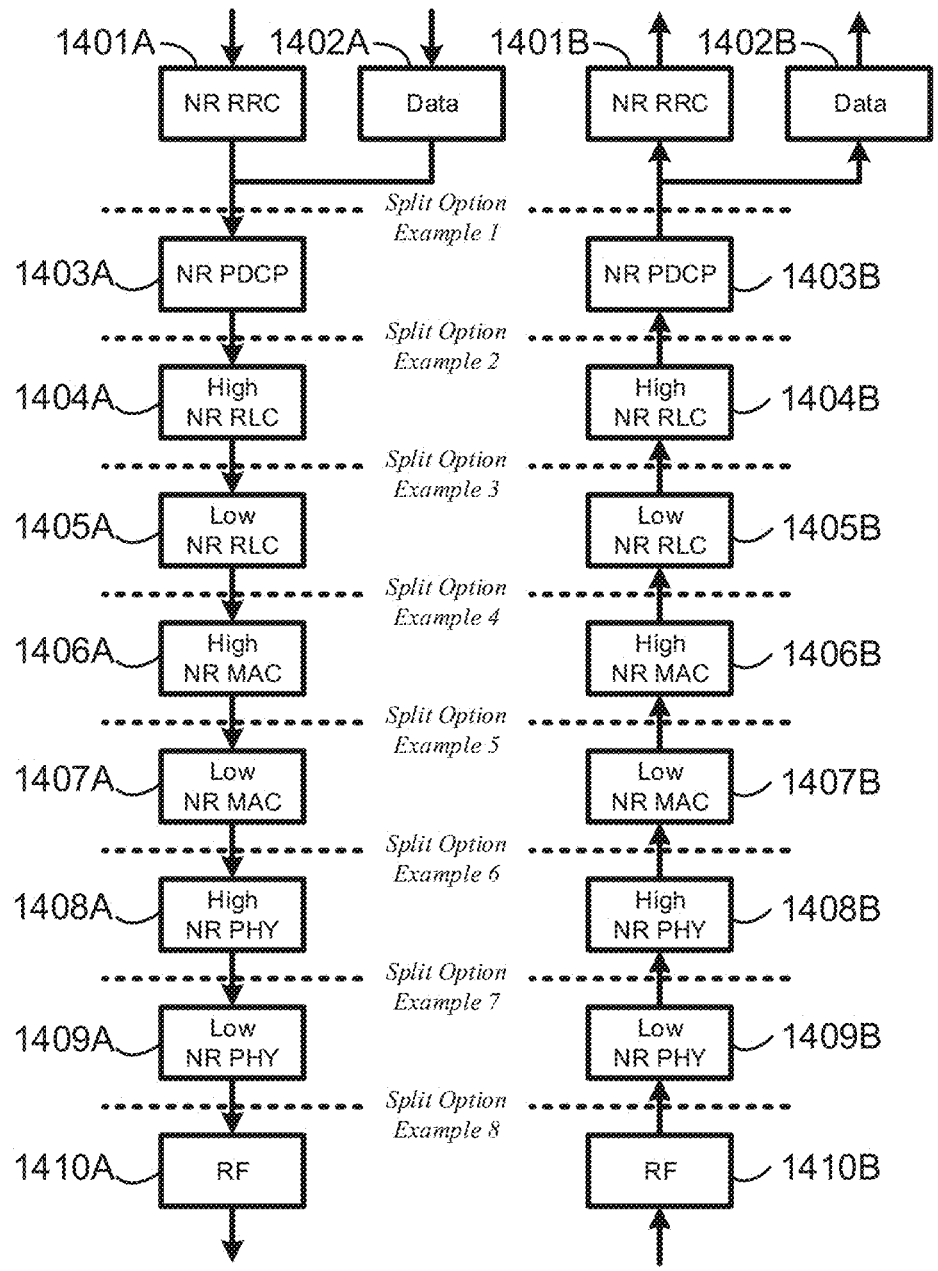
FIG. 14 shows functional split option examples of a centralized gNB deployment scenario.

FIG. 14 shows examples for different functional split options of a centralized gNB deployment scenario. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some scenarios, such as hotspot areas. Licensed Assisted Access (LAA) offers an alternative for operators to make use of unlicensed spectrum while managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

Network slicing may allow differentiated treatment depending on requirements for each type of tenant, user, use, service, device, communications, etc. With slicing, Mobile Network Operators (MNO) may be able to determine, for users and/or devices or groups of users and/or devices, one or more different types, such as tenant types, user types, use types, service types, device types, communication types, etc. Each type may comprise different service requirements. As examples, communications may be for enhanced mobile broadband (eMBB), ultra-reliable low-latency communications (URLLC), or any other type of communications. One or more Service Level Agreements (SLAs) or subscriptions may be associated with different service requirements and may determine what slice types each different type (e.g., tenant, user, use, service, device, communication, etc.) may be eligible to use. NSSAI (Network Slice Selection Assistance Information) may include one or more S-NSSAIs (Single NSSAI). Each network slice may be uniquely identified by a S-NSSAI. A wireless device may store a Configured and/or Accepted NSSAI per PLMN. The NSSAI may have standard values or PLMN specific values. For signaling between RAN and CN, a slice ID may be represented by an NSSAI and/or S-NSSAI.

Base stations and wireless devices may use resource status information to provide dynamic operations for a wireless device that requires service of one or more slices. Resource status information may comprise information about resources in a network (e.g., a RAN), such as radio resources, hardware resources, or interface resources. Decisions for handover, multi-connectivity initiation, and/or multi-connectivity modification for a wireless device may use resource status information to provide improved decisions to serve network slices for the wireless device based on current network conditions. For example, a wireless device with particular requirements or requests relating to the use of one or more network slices, or one or more services associated therewith, may be served by a base station making a decision for a handover, multi-connectivity initiation, and/or multi-connectivity modification for the wireless device that accounts for resources related to the one or more network slices, or associated services, for the wireless device.

A base station and/or a cell may support a resource isolation between different network slices. For example, a base station and/or a cell may provide a reliable service for a first slice if a second slice is in a high load status. To achieve the resource isolation between network slices, neighboring base stations may provide load balancing and/or differentiated handling of communications by, e.g., controlling multiple network slices. Base stations may control multiple network slices separately or simultaneously. Base stations may exchange resource status information for different network slices with neighboring base stations.

Network slicing in a RAN may be based on the following. RAN awareness of slices may indicate that the RAN may support a differentiated handling of traffic for different network slices, e.g., which may have been pre-configured. RAN may support the slice enabling in terms of RAN functions (e.g., the set of network functions that comprises each slice) in various ways. Selection of the RAN part of the network slice may indicate that the RAN may support the selection of the RAN part of the network slice. One or more slice ID(s) may be provided by the wireless device or the CN, which may identify one or more pre-configured network slices in the PLMN. The accepted NSSAI may be sent, e.g., by a CN to a wireless device and a RAN, after network slice selection. Resource management between slices may indicate that the RAN may support policy enforcement between slices, e.g., based on service level agreements. A single RAN node may support multiple slices. The RAN may be able to apply the best RRM policy for the SLA in place to each supported slice. Support of QoS may indicate that the RAN may support QoS differentiation within a slice.

RAN selection of a CN entity may be supported. For an initial attach, a wireless device may provide one or more slice ID(s). If available, the RAN may use the slice ID(s) for routing the initial NAS to an NGC CP function. If the wireless device does not provide any slice ID(s), the RAN may send the NAS signaling to a default NGC CP function. For subsequent accesses, the wireless device may provide a temporary identifier (e.g., Temp ID), which may be assigned to the wireless device by the NGC, e.g., to enable the RAN to route the NAS message to the appropriate NGC CP function as long as the Temp ID is valid (e.g., the RAN may be aware of and may be able to reach the NGC CP function which may be associated with the Temp ID). Additionally or alternatively, one or more methods for initial attach may apply. Resource isolation between slices may be supported by the RAN. RAN resource isolation may be achieved by using one or more RRM policies or protection mechanisms. For example, a shortage of shared resources in one slice that may otherwise break the service level agreement for another slice may be avoided. It may be possible to fully dedicate RAN resources to a certain slice.

Slice availability may be dependent on the RAN. Some slices may be available only in part of a network. Awareness in a gNB of the slices supported in the cells of its neighboring gNBs may be beneficial for inter-frequency mobility, e.g., in a connected mode. It may be assumed that the slice configuration may or may not change within the wireless device's registration area. The RAN and the CN may be responsible to handle a service request for a slice that may or may not be available in a given area. Admission or rejection of access to a slice may depend upon one or more factors such as support for the slice, availability of resources, or support of the requested service by other slices. Slice availability in a RAN may be handled during mobility. Neighbor gNBs may exchange slice availability on the interface connecting two nodes, e.g., an Xn interface between gNBs or any other interface between base stations. The core network may provide the RAN a mobility restriction list. This list may include those TAs (Tracking Areas) which support, or do not support, the slices for the wireless device. The slices supported at the source node may be mapped, e.g., if possible, to other slices at a target node. Examples of possible mapping mechanisms may be one or more of: mapping by the CN, e.g., if there may be a signaling interaction between the RAN and the CN and performance may not be impacted; mapping by the RAN, e.g., as an action following prior negotiation with the CN during a wireless device connection setup; and/or mapping by the RAN autonomously, e.g., if prior configuration of mapping policies took place at the RAN. Associating a wireless device with multiple network slices simultaneously may be supported. If a wireless device is associated with multiple slices simultaneously, a single signaling connection may be maintained.

A slice ID may be introduced as part of a PDU session information that may be transferred during mobility signaling, e.g., to provide mobility slice awareness for network slicing. By providing the slice ID, slice-aware admission and congestion control may be enabled. If a target cell is selected, handover signaling may be initiated and may attempt to move PDU session resources for active slices of the wireless device from one node to another node. A first gNB (e.g., source gNB) may be required to pass on slices, which a wireless device in question may be using, to a second gNB (e.g., target gNB) as part of a handover procedure. If a handover procedure involves a NGC (e.g., a core network node), during the procedure the target AMF (Access and Mobility Management Function, e.g., a core network node) may be responsible for aligning the set of slices supported in the new registration area between the wireless device and the network at a NAS level. PDU sessions that may be associated with the removed slices may be not admitted at a target node.

A core network node may be responsible for validating that a wireless device has the rights to access a network slice. Prior to receiving an initial context setup request message, the RAN may be allowed to apply some provisional and/or local policies, e.g., based on awareness of to which slice the wireless device may be requesting access. The CN may be aware of network slices to which the wireless device may belong. During the initial context setup, the RAN may be informed of network slices for which resources may be requested.

Network slicing in a RAN may include slice awareness in the RAN that may be introduced at a PDU session level, e.g., by indicating the slice ID corresponding to the PDU session. An indication of a slice ID may further indicate that: QoS flows within a PDU session may belong to the same network slice; within a slice, QoS differentiation may be supported; connection of a wireless device to multiple network slices may be supported, e.g., as multiple PDU sessions per wireless device may be able to be established; as a consequence of slice awareness at a PDU session level, user data pertinent to different network slices may or may not share the same NG-U tunnel; by adding the slice ID information to the PDU session information, mobility signaling may also become slice-aware and may enable per-slice admission and/or congestion control.

Following one or more of an initial access, an establishment of an RRC connection, and a selection of a correct CN instance, the CN may establish the complete wireless device context by sending the initial context setup request message to the gNB over a NG-C interface. The message may contain the slice ID as part of the PDU session(s) resource description. Upon successful establishment of the wireless device context and allocation of PDU resources to the relevant network slice(s), the RAN may respond with the initial context setup response message.

If new PDU sessions are to be established, and/or if existing PDU sessions are to be modified or released, the CN may request the RAN to allocate and/or release resources relative to the relevant PDU sessions, e.g., using the PDU session setup/modify/release procedures over a NG-C interface. For network slicing, slice ID information may be added per PDU session. By adding slice ID information, the RAN may be enabled to apply policies at the PDU session level according to the SLA represented by the network slice, e.g., while still being able to apply differentiated QoS within the slice. The RAN may confirm the establishment, modification, and/or release of a PDU session associated with a certain network slice, e.g., by responding with the PDU session setup/modify/release response message over the NG-C interface.

Figure 15:
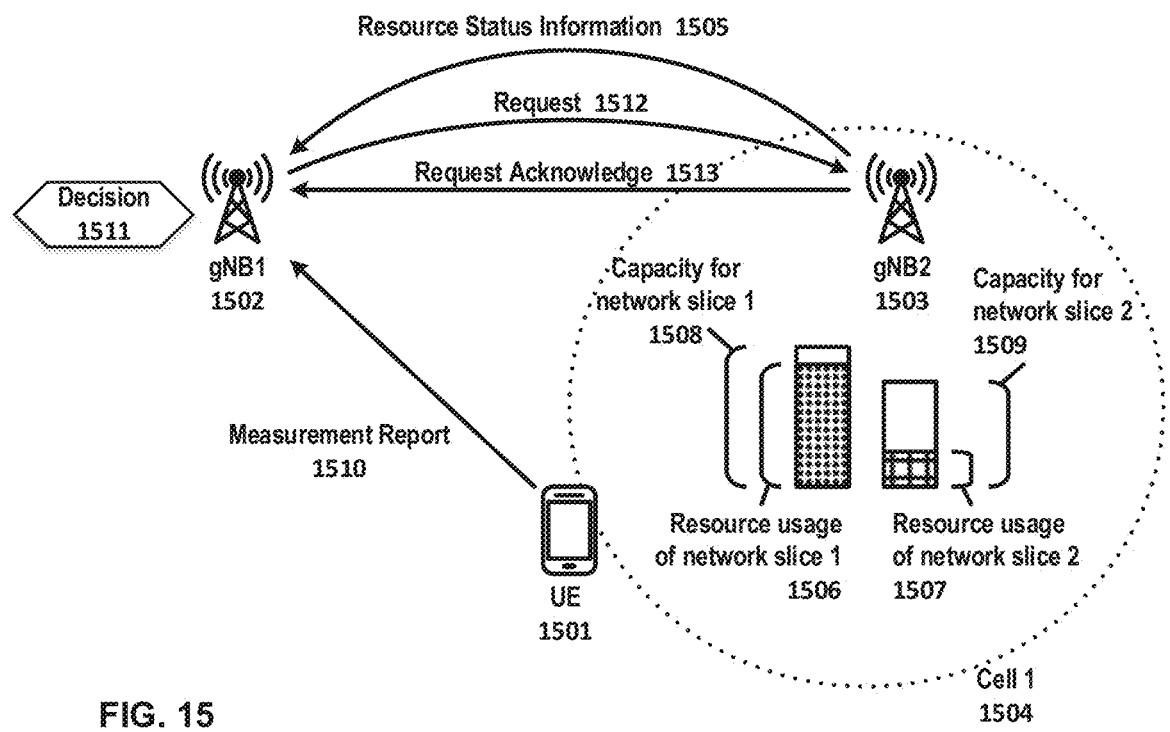
FIG. 15 shows an example for communications using resource status information.

FIG. 15 shows an example for communications using resource status information, e.g., for decisions relating to handover, multi-connectivity initiation, and multi-connectivity modification. Resource status information may be provided in communications between base stations, including, e.g., via an Xn interface. A first base station 1502 (e.g., a source gNB) may receive from a second base station 1503 (e.g., a target gNB), a first message 1505. The first message 1505 may comprise, e.g., a resource status information of a first cell 1504 and/or of the second base station 1503, a cell identifier of the first cell 1504, and/or one or more first network slice identifiers of one or more network slices. The resource status information 1505 may be associated with the one or more network slices. The resource status information 1505 may comprise, e.g., one or more of: a radio resource status information; an F1 interface load information, or e.g., a load information for an interface between a central unit and a distributed unit of the second base station 1503 or a front-haul high-layer split interface; an NG interface load information (e.g., load information for an interface between the second base station and a core network entity); a hardware load information; a composite available capacity information; and/or a network slice overload indicator. The resource status information 1505 may provide the first base station 1502 with one or more indications of the capacity of one or more network slices, such as the capacity for a first network slice 1508 and/or the capacity for a second network slice 1509, either or both of which may be served by the second base station 1503. Additionally or alternatively, the resource status information 1505 may provide the first base station 1502 with one or more indications of the resource usage of one or more network slices, such as the resource usage for a first network slice 1506 and/or the resource usage for a second network slice 1507, either or both of which may be served by the second base station 1503. The resource status information 1505 may comprise any information for any number of network slices that may be served by the second base station 1503.

The first base station 1502 may use various other information for a decision 1511 relating to handover, multi-connectivity initiation, and/or multi-connectivity modification. For example, the wireless device 1501 may report a measurement result via a measurement report 1510, e.g., by sending the measurement result in a measurement report 1510 to the first base station 1502. The measurement result may correspond to radio measurements by the wireless device 1501 for the first cell 1504 of the second base station 1503. The wireless device 1501 may employ one or more of the first network slices and/or a service associated with one or more of the first network slices. The first base station 1502 may make the decision 1511 for the wireless device 1501 based on one or more elements of the first message 1505, the measurement report 1510, one or more network slices served to the wireless device 1501, and/or one or more services served to the wireless device 1501.

The first base station 1502 may make a decision 1511 for a wireless device 1501 (e.g., a UE) at least based on one or more elements of the first message 1505. The first base station 1502 may transmit, to the second base station 1503, a second message 1512 associated with a request for the wireless device 1501. The request in the second message 1512 may be based on, or in response, to the decision 1511. The decision 1511 may be to initiate, e.g., one or more of: a handover toward the first cell 1504, a multi-connectivity initiation employing the first cell 1504, and/or a multi-connectivity modification of a multi-connectivity employing the first cell 1504. For example, the second message 1512 may comprise a handover request message, a multi-connectivity initiation request message, and/or a multi-connectivity modification message. The second message 1512 may comprise a cell identifier of the first cell 1504, a wireless device identifier of the wireless device 1501, one or more network slice identifiers of one or more network slices served to the wireless device 1501, one or more packet flow identifiers of one or more packet flows (e.g., bearers) associated with the one or more network slices served to the wireless device 1501, and/or the like.

After transmitting and/or in response to the second message 1512, the first base station may receive, from the second base station, a third message 1513 that may respond to the request of the second message 1512. The third message 1513 may comprise, e.g., a handover request acknowledge message, a multi-connectivity initiation acknowledge message, and/or a multi-connectivity modification acknowledge message. The third message 1513 may comprise one or more network slice identifiers of one or more accepted network slices, one or more network slice identifiers of one or more rejected network slices, a slice reject cause value indicating that a load of one or more slices is high and/or overloaded, a handover reject cause value indicating that a traffic load of one or more slices is high and/or overloaded, a multi-connectivity initiation reject cause value and/or a multi-connectivity modification reject cause value indicating that a traffic load of one or more slices is high and/or overloaded, and/or the like. After receiving or in response to the third message 1513, the first base station 1502 may transmit a command to the wireless device 1501. The command may comprise, e.g., a handover command or a command for multi-connectivity initiation and/or multi-connectivity modification. The handover command may be based on one or more elements of the third message 1513.

Figure 16:
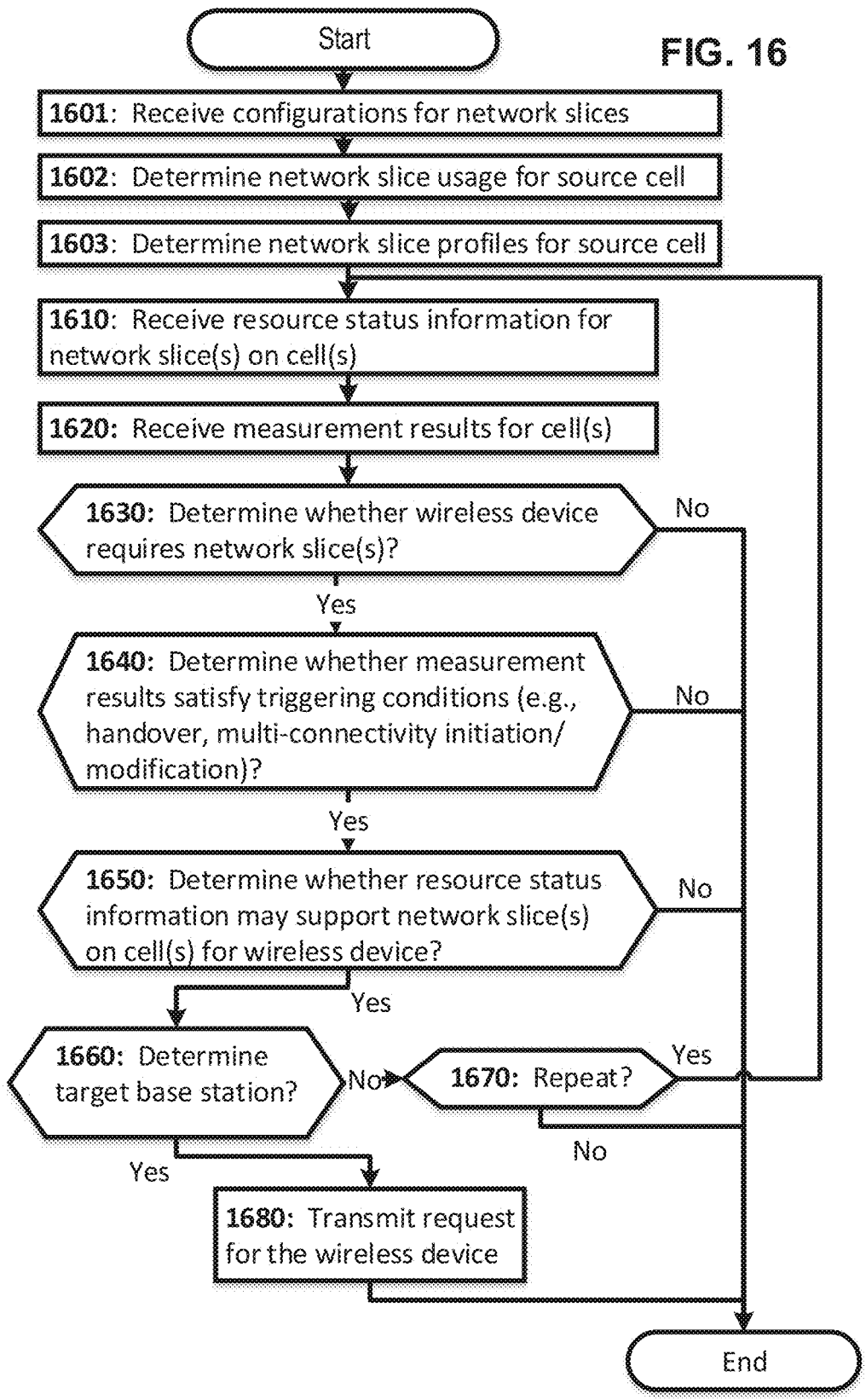
FIG. 16 shows an example for determining a handover, a multi-connectivity initiation, and/or a multi-connectivity modification for a wireless device.

FIG. 16 shows an example for a handover, a multi-connectivity initiation, and/or a multi-connectivity modification. The following may be performed, e.g., by the first base station 1502 during the decision 1511, e.g., for the wireless device 1501. The procedure may begin with the first base station 1502 receiving configurations for network slices, at step 1601. Configurations for network slices may comprise information such as types of network slices available in a network, services associated with network slices, priority levels associated with network slices, access permissions associated with network slices, network resources associated with network slices, and any other information a base station may require for serving a network slice or making a decision for serving a network slice.

At step 1602, the first base station 1502 may determine network slice usage for a cell it is serving (e.g., a source cell). For example, the first base station 1502 may determine the wireless devices it is serving that are using network slices, the network slices being used by those wireless devices, and/or the level of usage of the network slices by the wireless devices served by the first base station 1502, e.g., based on a PDU session and/or a QoS flow status associated with the network slices of the wireless devices. At step 1603, the first base station 1502 may use information, e.g., determined from step 1601, to determine network slice profiles. The network slice profiles may be, e.g., on a per slice basis and/or on a per wireless device basis. The network slice profiles may be used for responding to a request for a network slice by a wireless device. For example, the first base station 1502 may determine whether a wireless device may be able to obtain service for a network slice based on a network slice profile for the wireless device.

At step 1610, the first base station 1502 may receive resource status information 1505 for one or more network slices on or associated with one or more cells and/or on or associated with the second base station 1503. For example, resource status information 1505 may be received for a single network slice on the first cell 1504, a plurality of network slices on the first cell 1504, or any number of network slices on any number of cells. Resource status information 1505 for the first cell 1504 may be received before, after, or simultaneous with receiving of resource status information for any number of other cells. Step 1610 may conclude upon or after, e.g., resource status information 1505 for the first cell 1504 is received, resource status information 1505 for any cell or a threshold number of cells is received, a time duration, or the occurrence of an event (e.g., upon receipt of a measurement report from a wireless device, or any other event upon which a handover or a multi-connectivity decision may be based).

At step 1620, the first base station 1502 may receive measurement results for one or more cells from the wireless device 1501. The measurement results may comprise radio measurements by the wireless device 1501 for the first cell 1504 of the second base station 1503. The measurement results may also comprise radio measurements by the wireless device 1501 for one or more additional cells of one or more additional base stations.

At step 1630, the first base station 1502 may determine whether the wireless device 1501 requires one or more network slices. A requirement for a network slice may be based on a service requested by the wireless device 1501. The first base station 1502 may determine whether the wireless device 1501 requires one or more network slices based on, e.g., a request for a new service associated with a network slice or an indication that first base station 1502 is not sufficiently serving the network slice for the wireless device 1501. If the first base station 1502 determines that the wireless device 1501 does not require one or more network slices, the procedure may end. If, however, the first base station 1502 determines that the wireless device 1501 does require one or more network slices, the procedure may continue to step 1640.

At step 1640, the first base station 1502 may determine whether measurement results satisfy triggering conditions for the wireless device 1501. A triggering condition may comprise, e.g., measurement results that indicate a trigger condition such that the first base station 1502 may determine a slice load status of the second base station 1503, and/or an indication of a requirement for network slice support such that the first base station 1502 may determine a slice load status of the second base station 1503 and/or measurement results. If measurement results for the first cell 1504 comprise radio measurements that indicate the first cell 1504 is insufficient, or likely to be insufficient, for serving a network slice for the wireless device 1501, then the first base station 1502 may determine not to proceed with a request to the second base station 1503 for serving the network slice, and the procedure may end. If, however, measurement results for the first cell 1504 comprise radio measurements that indicate the first cell 1504 is sufficient, or is likely to be sufficient, for serving a network slice for the wireless device 1501, then the first base station 1502 may proceed to step 1650.

At step 1650, the first base station 1502 may determine whether resource status information 1505 may support one or more network slices on one or more cells for the wireless device 1501. The resource status information 1505 may provide the first base station 1502 with one or more indications of the capacity of one or more network slices, such as the capacity for a first network slice 1508 and/or the capacity for a second network slice 1509, either or both of which may be served by the second base station 1503. Additionally or alternatively, the resource status information 1505 may provide the first base station 1502 with one or more indications of the resource usage of one or more network slices, such as the resource usage for a first network slice 1506 and/or the resource usage for a second network slice 1507, either or both of which may be served by the second base station 1503. If the resource status information 1505 indicates that resources associated with the second base station 1503 for a requested network slice are insufficient, or are likely to be insufficient, for serving the requested network slice for the wireless device 1501, then the procedure may end. If, however, the resource status information indicates that resources associated with the second base station 1503 for a requested network slice are sufficient, or are likely to be sufficient, then the first base station 1502 may proceed to step 1660.

At step 1660, the first base station 1502 may determine one or more second base stations for the wireless device 1501. For example, if the second base station 1503 remains a possibility for serving the requested network slice for the wireless device 1501, the first base station 1502 may analyze one or more of radio resource status information; an F1 interface load information (or e.g., a load information for an interface between a central unit and a distributed unit, or a front-haut high-layer split interface); an NG interface load information (e.g., load information for an interface between the second base station and a core network entity); a hardware load information; a composite available capacity information; and/or a network slice overload indicator are satisfied by the second base station 1503. If the first base station 1502 determines that the second base station 1503 is insufficient, or is likely to be insufficient, for serving a requested network slice for the wireless device 1501, then, at step 1670, the first base station 1502 may determine whether to repeat one or more of the above steps using resource status information for another cell, or upon or after, e.g., a time duration or the occurrence of an event (e.g., upon receipt of a measurement report 1510 from a wireless device, upon receipt of a new resource status information 1505, or any other event upon which a handover or a multi-connectivity decision may be based). The first base station 1502 may determine to repeat the above steps any number of times before ultimately ending the procedure. If, however, the first base station 1502 determines at step 1660 that the second base station 1503 is sufficient, or likely to be sufficient, for serving a requested network slice for the wireless device 1501, then the procedure may proceed to step 1680.

At step 1680, the first base station 1502 may transmit a request for the wireless device 1501 to one or more second base stations determined at step 1660. The request may correspond to request 1512. The request may comprise, e.g., a handover request message, a multi-connectivity initiation request message, and/or a multi-connectivity modification request message. A successful procedure may result in the first base station 1502 receiving a request acknowledgement 1513, followed by a handover, a multi-connectivity initiation, and/or a multi-connectivity addition for the one or more second base stations to serve one or more network slices for the wireless device 1501.

Any base station may perform any combination of one or more of the above steps of FIG. 16. A wireless device, a core network device, or any other device, may perform any combination of a step, or a complementary step, of one or more of the above steps. Some or all of these steps may be performed, and the order of these steps may be adjusted. For example, one or more of steps 1630, 1640, and 1650 may not be performed for a decision 1511. As other examples, step 1640 and/or step 1650 may be performed before step 1630; step 1650 may be performed before step 1640; and/or step 1660 may be performed in place of step 1650. Results of one or more of steps 1630, 1640, and 1650 may be weighted differently from results of one or more other of these steps for an overall decision relating to a handover, a multi-connectivity initiation, and/or a multi-connectivity modification.

Figure 17:
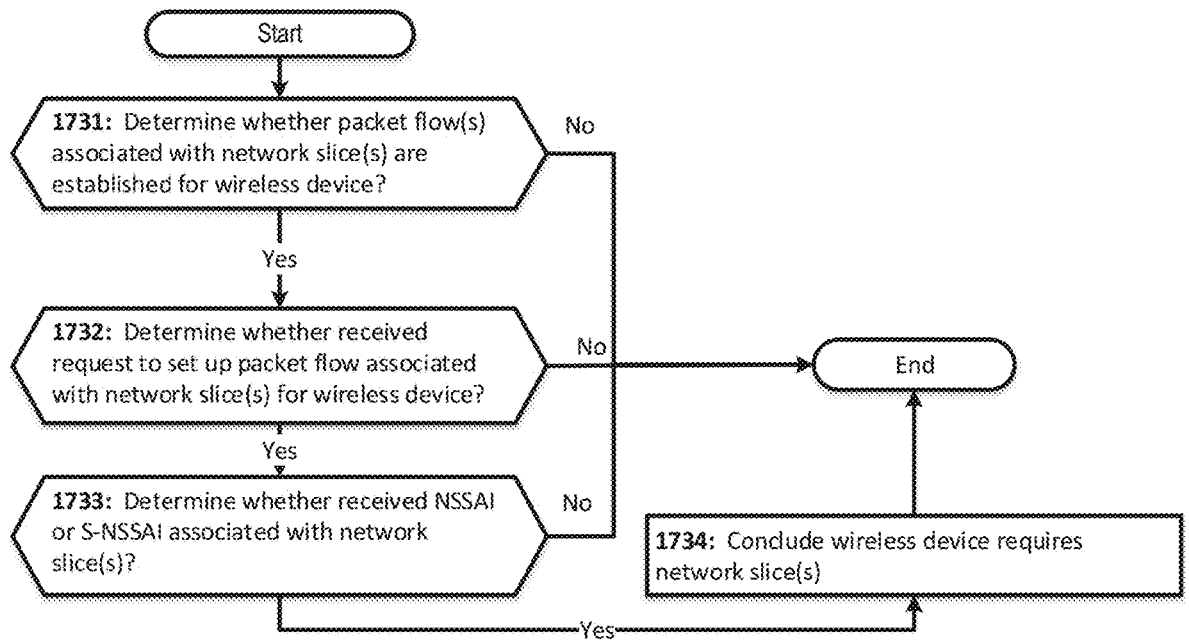
FIG. 17 shows additional details for determining a handover, a multi-connectivity initiation, and/or a multi-connectivity modification for a wireless device.

FIG. 17 shows additional details that may be performed, e.g., as part of step 1630 described above with respect to FIG. 16, to determine whether the wireless device 1501 requires one or more network slices. At step 1731, the first base station 1502 may determine whether one or more packet flows associated with one or more network slices are established for the wireless device 1501. If no such packet flows are established for the wireless device 1501, the wireless device 1501 may not require service of one or more requested network slices and the process may end. If, however, the first base station 1502 determines that such packet flows are established for the wireless device 1501, the process may continue to step 1732.

At step 1732, the first base station 1502 may determine whether it has received a request to set up one or more packet flows associated with one or more network slices for the wireless device 1501. If no such request for packet flows is received from the wireless device 1501, the wireless device 1501 may not require service of one or more requested network slices and the process may end. If, however, the first base station 1502 determines that a request for such packet flows has been received from the wireless device 1501, the process may continue to step 1733.

At step 1733, the first base station 1502 may determine whether it has received one or more Network Slice Selection Assistance Information (NSSAI) and/or Single NSSAI (S-NSSAI) associated with one or more requested network slices. If no such NSSAI or S-NSSAI is received and associated with one or more requested network slices, the wireless device 1501 may not require service of one or more requested network slices and the process may end. If, however, the first base station 1502 determines that one or more NSSAI and/or S-NSSAI has been received and is associated with one or more requested network slices, the first base station 1502 may conclude, at step 1734, that the wireless device 1501 requires the requested one or more network slices and the procedure of FIG. 17 may end by returning to step 1640 in FIG. 16 described above.

Any base station may perform any combination of one or more of the above steps of FIG. 17. A wireless device, a core network device, or any other device, may perform any combination of a step, or a complementary step, of one or more of the above steps. Some or all of these steps may be performed, and the order of these steps may be adjusted. For example, one or more of steps 1731, 1732, and 1733 may not be performed for step 1630. As other examples, step 1732 and/or step 1733 may be performed before step 1731; and/or step 1733 may be performed before step 1732. Results of one or more of steps 1731, 1732, and 1733 may be weighted differently from results of one or more other of these steps for an overall decision relating to a handover, a multi-connectivity initiation, and/or a multi-connectivity modification.

Figure 18:
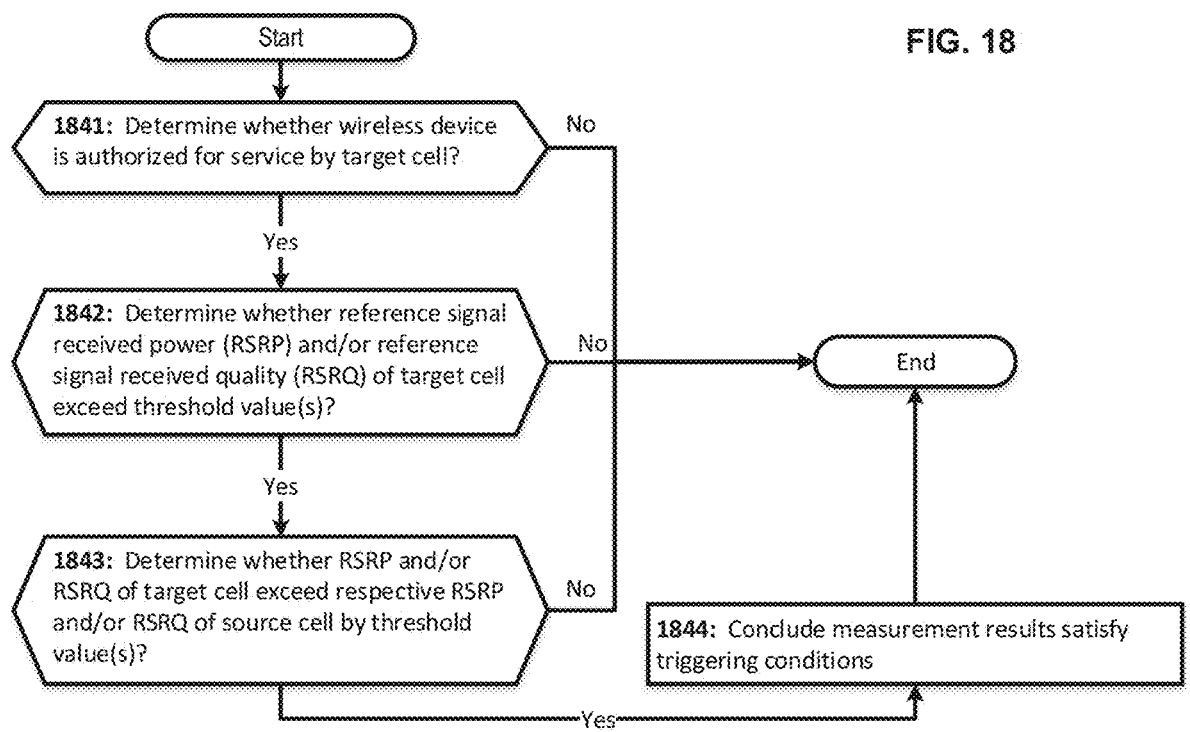
FIG. 18 shows additional details for determining a handover, a multi-connectivity initiation, and/or a multi-connectivity modification for a wireless device.

FIG. 18 shows additional details that may be performed, e.g., as part of step 1640 described above with respect to FIG. 16, to determine whether the measurement results in the measurement report 1510 satisfy one or more triggering conditions, e.g., for a handover, a multi-connectivity initiation, and/or a multi-connectivity modification for the wireless device 1501. At step 1841, the first base station 1502 may determine whether the wireless device 1501 is authorized for service by a target cell. The first base station 1502 may make this determination based on, e.g., one or more of the configurations for network slices, network slice usage, and/or network slice profiles from steps 1601-1603. If the first base station 1502 determines that the wireless device 1501 is not authorized for service by a target cell, the process may end. If, however, the first base station 1502 determines that the wireless device 1501 is authorized for service by a target cell, the process may continue to step 1842.

At step 1842, the first base station 1502 may determine whether reference signal received power (RSRP) and/or reference signal received quality (RSRQ) of a target cell satisfies or exceeds one or more threshold values. If RSRP and/or RSRQ of the target cell does not satisfy or exceed one or more threshold values, the target cell may not be a suitable candidate as a target cell for the requested one or more network slices for the wireless device 1501, and the process may end. If, however, the first base station 1502 determines that RSRP and/or RSRQ of the target cell satisfy or exceed one or more threshold values, the process may continue to step 1843.

At step 1843, the first base station 1502 may determine whether RSRP and/or RSRQ of a target cell satisfies or exceeds respective RSRP and/or RSRQ of the source cell of the first base station 1502 by one or more threshold values. If RSRP and/or RSRQ of the target cell does not satisfy or exceed respective RSRP and/or RSRQ of the source cell of the first base station 1502, the target cell may not be a suitable candidate as a target cell for the requested one or more network slices for the wireless device 1501, and the process may end. If, however, the first base station 1502 determines that RSRP and/or RSRQ of the target cell satisfies or exceeds respective RSRP and/or RSRQ of the source cell of the first base station 1502, the first base station 1502 may conclude, at step 1844, that the measurement results in the measurement report 1510 satisfy one or more triggering conditions, e.g., for a handover, a multi-connectivity initiation, and/or a multi-connectivity modification for the wireless device 1501, and the procedure of FIG. 18 may end by returning to step 1650 in FIG. 16 described above.

Any base station may perform any combination of one or more of the above steps of FIG. 18. A wireless device, a core network device, or any other device, may perform any combination of a step, or a complementary step, of one or more of the above steps. Some or all of these steps may be performed, and the order of these steps may be adjusted. For example, one or more of steps 1841, 1842, and 1843 may not be performed for step 1640. As other examples, step 1842 and/or step 1843 may be performed before step 1841; and/or step 1843 may be performed before step 1842. Results of one or more of steps 1841, 1842, and 1843 may be weighted differently from results of one or more other of these steps for an overall decision relating to a handover, a multi-connectivity initiation, and/or a multi-connectivity modification.

Figure 19:
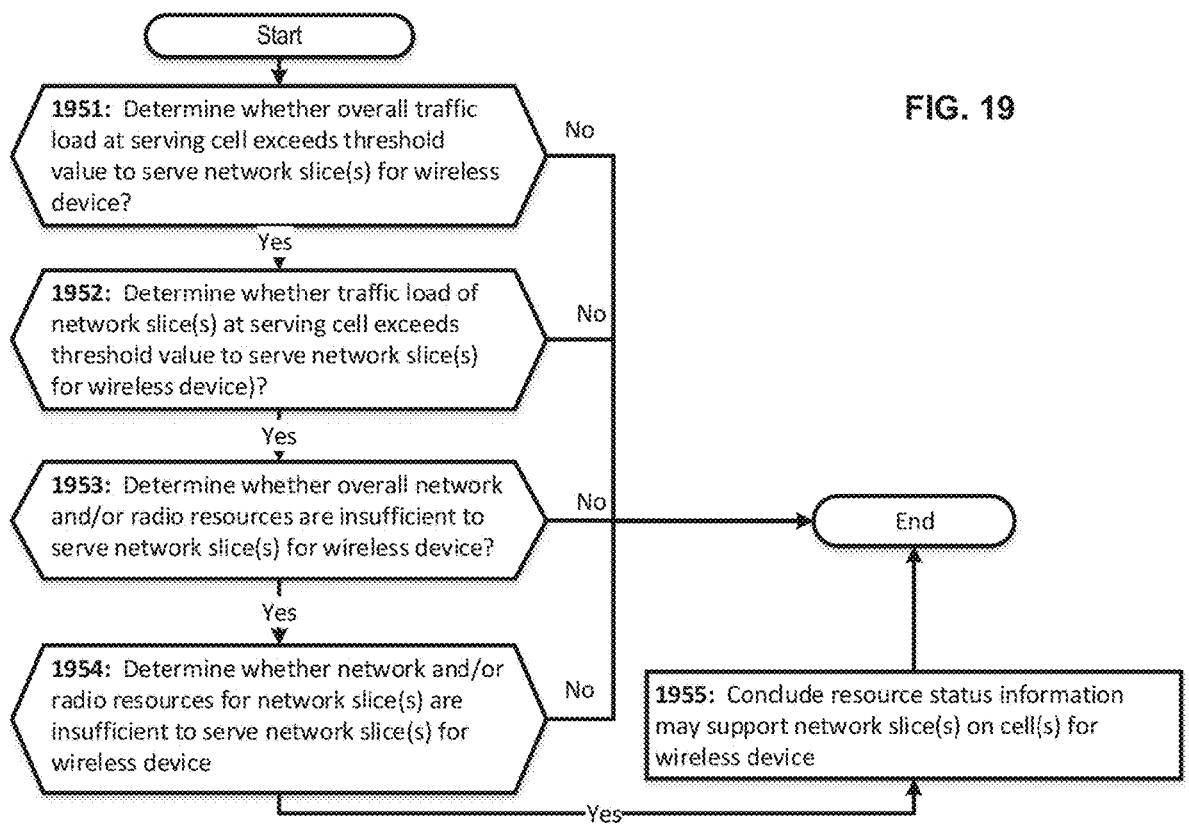
FIG. 19 shows additional details for determining a handover, a multi-connectivity initiation, and/or a multi-connectivity modification for a wireless device.

FIG. 19 shows additional details that may be performed, e.g., as part of step 1650 described above with respect to FIG. 16, to determine whether resource status information may support one or more network slices on one or more cells for the wireless device 1501, e.g., for a handover, a multi-connectivity initiation, and/or a multi-connectivity modification for the wireless device 1501. At step 1951, the first base station 1502 may determine whether overall traffic load at the serving cell of the first base station 1502 exceeds a threshold value to serve one or more network slices for the wireless device 1501. The first base station 1502 may make this determination based on, e.g., one or more load indicators received in the resource status information 1505 (e.g., at step 1610). If the first base station 1502 determines that the overall traffic load at the serving cell of the first base station 1502 does not exceed the threshold value to serve one or more network slices for the wireless device 1501, the first base station 1502 may be able to serve the one or more network slices for the wireless device 1501 and the process may end. If, however, the first base station 1502 determines that the overall traffic load at the serving cell of the first base station 1502 exceeds a threshold value to serve one or more network slices for the wireless device 1501, the process may continue to step 1952.

At step 1952, the first base station 1502 may determine whether the traffic load of one or more network slices at the serving cell of the first base station 1502 exceeds a threshold value. If the traffic load of one or more network slices at the serving cell of the first base station 1502 does not exceed the threshold value, the first base station 1502 may be able to serve the one or more network slices for the wireless device 1501 and the process may end. If, however, the first base station 1502 determines that the traffic load of one or more network slices at the serving cell of the first base station 1502 exceeds the threshold value, the process may continue to step 1953.

At step 1953, the first base station 1502 may determine whether current overall network and/or radio resources are insufficient to serve one or more network slices for the wireless device 1501. If current overall network and/or radio resources for one or more network slices are sufficient to serve one or more network slices for the wireless device 1501, the first base station 1502 may be able to serve the one or more network slices for the wireless device 1501 and the process may end. If, however, the first base station 1502 determines that current overall network and/or radio resources for one or more network slices are insufficient to serve one or more network slices for the wireless device 1501, the process may continue to step 1954.

At step 1954, the first base station 1502 may determine whether current network and/or radio resources for one or more network slices are insufficient to serve one or more network slices for the wireless device 1501. If current network and/or radio resources for one or more network slices are sufficient to serve one or more network slices for the wireless device 1501, the first base station 1502 may be able to serve the one or more network slices for the wireless device 1501 and the process may end. If, however, the first base station 1502 determines that current network and/or radio resources for one or more network slices are insufficient to serve one or more network slices for the wireless device 1501, the first base station 1502 may conclude, at step 1955, that the resource status information 1505 may support one or more network slices for the wireless device 1501, and the procedure of FIG. 19 may end by returning to step 1660 in FIG. 16 described above.

Any base station may perform any combination of one or more of the above steps of FIG. 19. A wireless device, a core network device, or any other device, may perform any combination of a step, or a complementary step, of one or more of the above steps. Some or all of these steps may be performed, and the order of these steps may be adjusted. For example, one or more of steps 1951, 1952, 1953, and 1954 may not be performed for step 1650. As other examples, step 1952, step 1953, and/or step 1954 may be performed before step 1951; step 1953 and/or step 1954 may be performed before step 1952; step 1954 may be performed before step 1953; and/or any one or more of steps 1951-1954 may be replaced by step 1660. Results of one or more of steps 1951, 1952, 1953, and 1954 may be weighted differently from results of one or more other of these steps for an overall decision relating to a handover, a multi-connectivity initiation, and/or a multi-connectivity modification.

Figure 20:
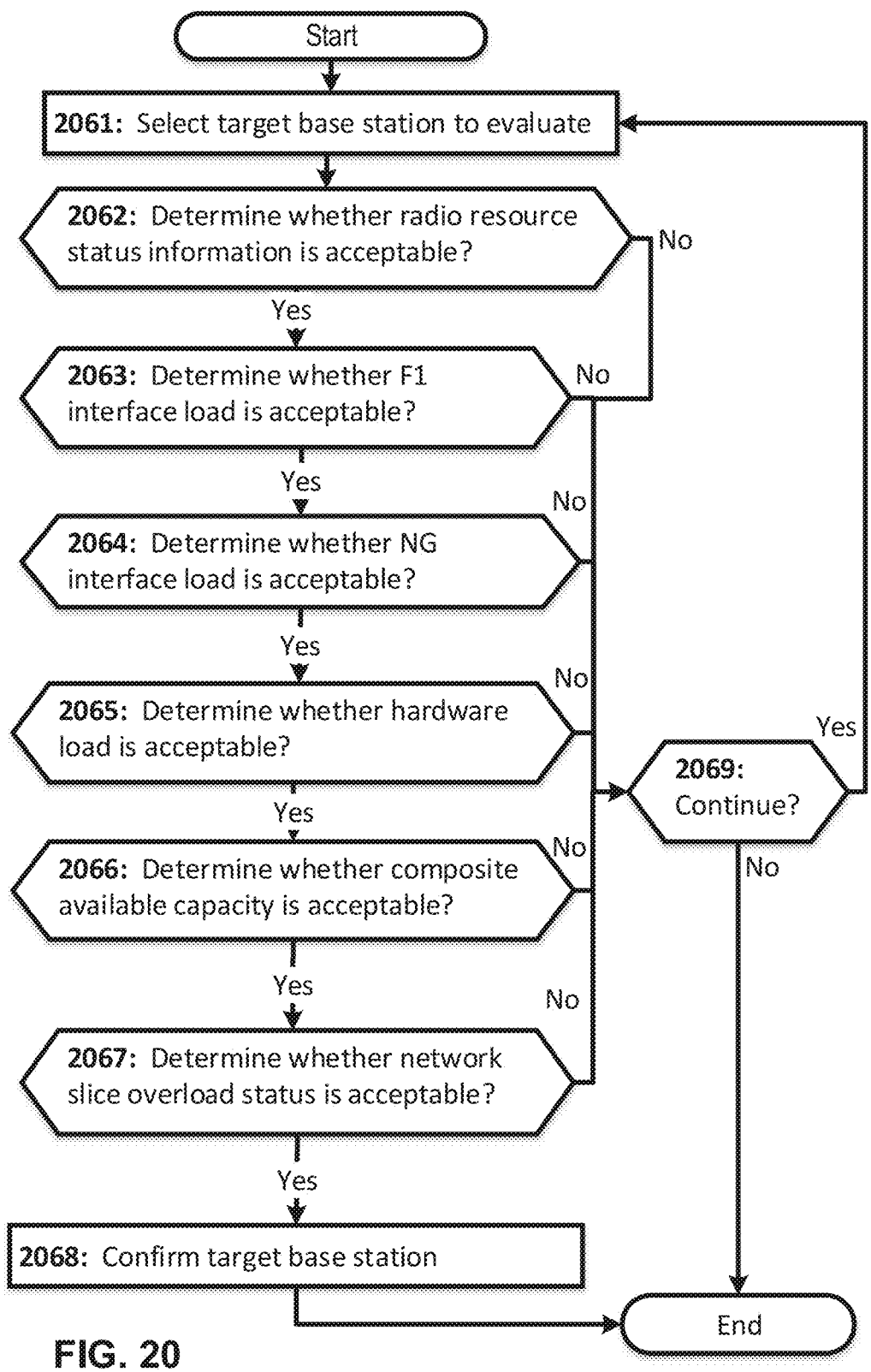
FIG. 20 shows additional details for determining a handover, a multi-connectivity initiation, and/or a multi-connectivity modification for a wireless device.

FIG. 20 shows additional details that may be performed, e.g., as part of step 1660 described above with respect to FIG. 16, to determine one or more second base stations, e.g., for a handover, a multi-connectivity initiation, and/or a multi-connectivity modification for the wireless device 1501. At step 2061, the first base station 1502 may select one or more second base stations to evaluate. For example, the first base station 1502 may evaluate the second base station 1503, e.g., as a target base station, upon or after receiving resource status information 1505 from the second base station 1503. The first base station 1502 may select one or more additional base stations to evaluate, e.g., based on previously received resource status information 1505 from the second base station 1503 or from any other base station. Additionally or alternatively, the first base station 1502 may select one or more second base stations based on one or more of configurations for network slices, network slice usage, and/or network slice profiles (e.g., from steps 1601-1603). Additionally or alternatively, the first base station 1502 may select one or more second base stations based on a measurement report (e.g., the measurement report 1510 from the wireless device 1501) and/or any other information. After selecting one or more second base stations to evaluate, the process may continue to step 2062.

At step 2062, the first base station 1502 may determine whether radio resource status information is acceptable, e.g., for a handover, a multi-connectivity initiation, and/or a multi-connectivity modification for the wireless device 1501. Radio resource status information may be included in resource status information 1505. Radio resource status information may provide an indication of whether, or the extent to which, cells in a network may be overloaded. A base station may use radio resource blocks for uplink and downlink data transmission to serve a wireless device. The radio resource status information may comprise an indication of the usage of radio resource blocks by wireless devices or base stations to transmit packets. By determining the usage of resource blocks across devices in a network, the first base station 1502 may be able to identify an availability of resource blocks in one or more second base stations to serve a wireless device, including a particular network slice or associated service for the wireless device 1501.

Examples of radio resource status information may include one or more of physical layer resource block usage information for a downlink guaranteed bit rate (GBR), a downlink non-GBR (non-guaranteed bit rate), an uplink GBR, an uplink non-GBR, a total downlink, and/or a total uplink transmission associated with the first cell and/or each network slice of the one or more first network slices served via the first cell. GBR transmissions may be reserved for real-time services, and non-GBR transmissions may be used for non-real time services. For example, if a wireless device requires a network slice associated with real-time services, then the first base station 1502 may initially determine whether downlink GBR and/or uplink GBR for a particular base station is satisfactory to determine whether a handover to that base station may be possible. If downlink GBR and/or uplink GBR for an initial base station are not sufficient for the network slice of the wireless device, then the first base station 1502 may determine whether a downlink GBR and/or uplink GBR for another base station are sufficient for the network slice of the wireless device. If the network slice is associated with non-real time services, then the first base station 1502 may initially determine whether uplink non-GBR and/or downlink non-GBR for one or more base stations are sufficient. If the network slice is associated with services that are related to a greater use of uplink transmissions (e.g., video transmission), then the first base station 1502 may initially determine whether uplink GBR and/or uplink non-GBR for one or more base stations is sufficient for the network slice. If the network slice is associated with services that are related to a greater use of downlink transmissions (e.g., video reception), then the first base station 1502 may initially determine whether downlink GBR and/or downlink non-GBR for one or more base stations is sufficient for the network slice. The radio resource status may comprise a physical layer resource block usage information for each network slice of the one or more first network slices served via the first cell. If an initial determination is made that one or more base stations may be sufficient for a network slice of the wireless device, e.g., based on one or more of uplink GBR, uplink non-GBR, downlink GBR, and/or downlink non-GBR, then the first base station 1502 may determine whether total downlink and/or total uplink for one or more base stations are sufficient for the network slice. The first base station 1502 may evaluate a total downlink and/or total uplink for one or more base stations as an initial step, and if sufficient, then the first base station 1502 may determine whether one or more of uplink GBR, uplink non-GBR, downlink GBR, and/or downlink non-GBR are sufficient for a network slice of the wireless device 1501.

The physical layer resource block usage information may indicate a physical layer resource block usage level of the first cell and/or each network slice of the one or more first network slices. The physical layer resource block usage information may indicate, e.g., a low usage status, a medium usage status, a high usage status, and/or a full usage status of the first cell and/or each network slice of the one or more first network slices. Additionally or alternatively, an operator may specify one or more threshold values to indicate a particular usage that may be used by the first base station 1502 to determine whether one or more second base stations may be a candidate for serving one or more network slices for the wireless device 1501. The physical layer resource block usage information may comprise one or more network slice identifiers of one or more overloaded network slices in the first cell.

The physical layer resource block usage information may indicate a physical layer resource block usage status of the first cell and/or each network slice of the one or more first network slices served via the first cell. The physical layer resource block usage status may be associated with a downlink GBR, a downlink non-GBR, an uplink GBR, an uplink non-GBR, a total downlink, and/or a total uplink transmission of the first cell and/or each network slice of the one or more first network slices. The physical layer resource block usage information may indicate a physical layer resource block usage amount ratio of each network slice of the one or more first network slices compared to a physical layer resource block usage amount of other network slices in the first cell. The physical layer resource block usage information may indicate a physical layer resource block usage amount ratio of each network slice of the one or more first network slices compared to a total physical layer resource block amount of the first cell. The physical layer resource block usage information may indicate a physical layer resource block usage amount ratio of each network slice of the one or more first network slices compared to a physical layer resource block amount allowed for the each network slice.

If the first base station 1502 determines that radio resource status information is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that radio resource status information is acceptable, e.g., for a handover, a multi-connectivity initiation, and/or a multi-connectivity modification for the wireless device 1501, the process may continue to step 2063.

At step 2063, the first base station 1502 may determine whether an F1 interface load is acceptable, e.g., for a handover, a multi-connectivity initiation, and/or a multi-connectivity modification for the wireless device 1501. An F1 interface load indicator may be included in resource status information 1505. A base station may be required to provide resources between a central unit (CU) and a distributed unit (DU) to serve a wireless device. The CU may provide upper layer functionalities (e.g., RRC), and the DU may provide physical layer, LAN layer, and RRC functionalities. The CU-DU interface may result in a bottleneck for serving a wireless device. By identifying resources relating to this interface, the first base station 1502 may be able to avoid a bottleneck scenario. For example, the F1 interface load indicator may indicate a load information of an F1 interface, or, e.g., an interface load indicator may indicate load information for a front-haul high-layer split interface or any interface between a central unit (CU) and a distributed unit (DU). The DU may be of the second base station and/or the first cell described above. The F1 interface may comprise an interface between a CU and a DU of a base station (e.g., gNB). The F1 interface load indicator may indicate an F1 interface load information for the first cell that may be served by the DU. The F1 interface load indicator may indicate F1 interface load information for each network slice of the one or more first network slices served via the second base station, the first cell, and/or a distributed unit for the first cell. The F1 interface load information may indicate an F1 interface load level status of the second base station, the first cell, the distributed unit for the first cell (e.g., F1 interface load level status per DU), and/or each network slice of the one or more first network slices served via the first cell. The F1 interface load information may indicate, e.g., a low load status, a medium load status, a high load status, and/or an overload status of the second base station, the first cell, the distributed unit for the first cell, and/or each network slice of the one or more first network slices. The F1 interface load information may comprise one or more network slice identifiers of one or more overloaded network slices in the first cell, the distributed unit for the first cell, and/or the second base station. The F1 interface load information may comprise one or more cell identifiers of one or more overloaded cells of the distributed unit for the first cell.

While the F1 interface load indicator may provide an indication of load information of an interface for a cell, it may or may not always be possible to obtain such information for a specific cell. F1 interface load information may be used, in addition to or as an alternative to the F1 interface load indicator, to indicate an F1 interface load share status a cell. For example, the F1 interface load information may comprise an indication of an F1 interface load share status of the first cell and/or of each network slice of the one or more first network slices served via the first cell. The F1 interface load information may indicate an F1 interface resource usage amount ratio (e.g., an F1 interface load share amount ratio) of the first cell compared to an F1 interface resource usage amount of other cells of the distributed unit for the first cell and/or compared to a total F1 interface resource amount of the distributed unit for the first cell. The F1 interface load information may indicate an F1 interface resource usage amount ratio (e.g., an F1 interface load share amount ratio) of each network slice of the one or more first network slices compared to an F1 interface resource usage amount of other network slices in the distributed unit for the first cell and/or the first cell. The F1 interface load information may indicate an F1 interface resource usage amount ratio (e.g., an F1 interface load share amount ratio) of each network slice of the one or more first network slices compared to a total F1 interface resource amount of the distributed unit for the first cell and/or for the first cell.

The first base station 1502 may make a decision for a wireless device (e.g., handover, multi-connectivity initiation, and/or multi-connectivity modification) based on a combination of the F1 interface load level and the F1 interface load share status. For example, the F1 interface load level may be used as an initial step to determine whether an F1 load level is sufficiently low, e.g., a low load status, a medium load status, or any other load below a threshold value. If the F1 interface load level is sufficiently low, then the F1 interface load share status may be evaluated as part of the decision for a wireless device. The F1 interface load share status may be used to determine whether a particular cell and/or slice may be used to serve the wireless device 1501. For example, if the F1 interface load share status for a first cell and/or slice indicates a usage amount that is sufficiently low relative to the F1 interface resource usage amount of other network slices for the cell or in the DU for the cell (e.g., below a threshold value), then the first cell may be selected, or remain a candidate for selection, to serve the wireless device. If, however, the F1 load level is not sufficiently low, e.g., a high load status, an overload status, or any other load above a threshold value, then the first base station 1502 may or may not consider the F1 interface load share status, or the first base station 1502 may consider the F1 interface load share status with a reduced weight (e.g., it may be less of a factor in the decision for the wireless device).

If the first base station 1502 determines that the F1 interface load is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that the F1 interface load is acceptable, e.g., for a handover, a multi-connectivity initiation, and/or a multi-connectivity modification for the wireless device 1501, the process may continue to step 2064.

At step 2064, the first base station 1502 may determine whether an NG interface load is acceptable, e.g., for a handover, a multi-connectivity initiation, and/or a multi-connectivity modification for the wireless device 1501. An NG interface load indicator may be included in resource status information 1505. The NG interface load indicator may indicate a load of an interface between a base station (e.g., a target base station) and a core network entity. The NG interface load indicator may comprise an NG interface load information for each network slice of the one or more first network slices served via the second base station and/or the first cell. The NG interface load information may indicate an NG interface load level status of the second base station, the first cell, and/or each network slice of the one or more first network slices. The NG interface load information may indicate, e.g., a low load status, a medium load status, a high load status, and/or an overload status of the second base station, the first cell, and/or each network slice of the one or more first network slices. The NG interface load information may comprise one or more network slice identifiers of one or more overloaded network slices in the first cell and/or for the second base station.

The NG interface load information may indicate an NG interface load share status of the first cell and/or each network slice of the one or more first network slices served via the first cell. The NG interface load information may indicate an NG interface resource usage amount ratio (e.g., an NG interface load share amount ratio) of the first cell compared to an NG interface resource usage amount of other cells of the second base station and/or compared to a total NG interface resource amount of the second base station. The NG interface load information may indicate an NG interface resource usage amount ratio (e.g., an NG interface load share amount ratio) of each network slice of the one or more of the one or more first network slices compared to an NG interface resource usage amount of other network slices in the second base station and/or the first cell. The NG interface load information may indicate an NG interface resource usage amount ratio (e.g., an NG interface load share amount ratio) of each network slice of the one or more first network slices compared to a total NG interface resource amount of the second base station and/or the first cell.

Resource status information may also comprise resource usage amounts of any other interfaces that may be used for a wireless device. For example, resource status information may comprise resource usage amounts of an S1 interface between a base station and a core network. Resource status information of any interface may be used in addition to, or in the alternative to, resource status information of one or both of the F1 interface or NG interface.

If the first base station 1502 determines that the NG interface load is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that the NG interface load is acceptable, e.g., for a handover, a multi-connectivity initiation, and/or a multi-connectivity modification for the wireless device 1501, the process may continue to step 2065.

At step 2065, the first base station 1502 may determine whether a hardware load is acceptable, e.g., for a handover, a multi-connectivity initiation, and/or a multi-connectivity modification for the wireless device 1501. A hardware load indicator may be included in resource status information 1505. The hardware load indicator may indicate a hardware load information. Hardware load information may correspond to one or more hardware loads in a device (e.g., load of a central processing unit (cpu), memory, bus, and/or the like), a total hardware load of the device, and/or a hardware load on a per slice, service, or cell basis. An operator may determine what load(s) to associate with a hardware load indicator, and the first base station 1502 may or may not know the specific load(s) associated with a hardware load indicator that it may receive. Hardware load information may be provided for a base station and/or a cell, such as the second base station 1503 and/or the first cell 1504 described above. Hardware load information may be associated with one or more network slices. For example, the hardware load indicator may comprise a hardware load information for each network slice of the one or more first network slices served via the second base station and/or the first cell. The hardware load information may indicate a hardware load level status of the second base station, the first cell, and/or each network slice of the one or more of the one or more first network slices. The hardware load information may indicate, e.g., a low load status, a medium load status, a high load status, and/or an overload status of the second base station, the first cell, and/or each network slice of the one or more first network slices. The hardware load information may comprise one or more network slice identifiers of one or more overloaded network slices in the first cell and/or for the second base station.

The hardware load information may indicate a hardware load share status of the first cell and/or each network slice of the one or more of the one or more first network slices. The hardware load information may indicate a hardware resource usage amount ratio (e.g., a hardware load share amount ratio) of the first cell compared to a hardware resource usage amount of other cells of the second base station and/or compared to a total hardware resource amount of the second base station. The hardware load information may indicate a hardware resource usage amount ratio (e.g., a hardware load share amount ratio) of each network slice of the one or more first network slices compared to a hardware resource usage amount of other network slices in the second base station and/or the first cell. The hardware load information may indicate a hardware resource usage amount ratio (e.g., a hardware load share amount ratio) of each network slice of the one or more of the one or more first network slices compared to a total hardware resource amount of the second base station and/or the first cell.

If the first base station 1502 determines that the hardware load is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that the hardware load is acceptable, e.g., for a handover, a multi-connectivity initiation, and/or a multi-connectivity modification for the wireless device 1501, the process may continue to step 2066.

At step 2066, the first base station 1502 may determine whether a composite available capacity is acceptable, e.g., for a handover, a multi-connectivity initiation, and/or a multi-connectivity modification for the wireless device 1501. A composite available capacity indicator or group of indicators may be included in resource status information 1505. The composite available capacity group may comprise a cell capacity class value and/or a capacity value for a downlink and/or an uplink associated with the first cell and/or each network slice of the one or more first network slices served via the first cell. The cell capacity class value may indicate a value classifying a cell capacity of the first cell with regards to other cells. The cell capacity value may provide information about basic performance of each cell. The cell capacity class value may indicate a value classifying a capacity for each network slice of the one or more first network slices with regards to other cells and/or other network slices of the first cell. The capacity value may indicate an amount of resources, for the first cell and/or each network slice of the one or more first network slices, that are available relative to a total resource for the second base station, the first cell, and/or each network slice of the one or more first network slices.

The cell capacity class value and/or capacity value for a downlink and/or an uplink associated with a cell or slice may be combined with other resource status information to provide the first base station 1502 with a more complete understanding of an ability of a target cell (e.g., the first cell 1504) to serve the wireless device 1501.

If the first base station 1502 determines that the composite available capacity is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that the composite available capacity is acceptable, e.g., for a handover, a multi-connectivity initiation, and/or a multi-connectivity modification for the wireless device 1501, the process may continue to step 2067.

At step 2067, the first base station 1502 may determine whether a network slice overload status is acceptable, e.g., for a handover, a multi-connectivity initiation, and/or a multi-connectivity modification for the wireless device 1501. A network slice overload indicator may be included in resource status information 1505. The network slice overload indicator may indicate whether each network slice of the one or more first network slices is overloaded. In an example, the network slice overload indicator may indicate a low load status, a medium load status, a high load status, and/or an overload status of each network slice of the one or more of the one or more first network slices served via the first cell.

If the first base station 1502 determines that the network slice overload status is not acceptable, e.g., for a handover, a multi-connectivity initiation, and/or a multi-connectivity modification for the wireless device 1501, the process may continue to step 2069, where a decision may be made whether to end, or continue the procedure by returning to step 2061. If the first base station 1502 determines that the network slice overload status is acceptable, e.g., for a handover, a multi-connectivity initiation, and/or a multi-connectivity modification for the wireless device 1501, the process may end by returning to step 1680 in FIG. 16 described above.

Any base station may perform any combination of one or more of the above steps of FIG. 20. A wireless device, a core network device, or any other device, may perform any combination of a step, or a complementary step, of one or more of the above steps. Some or all of these steps may be performed, and the order of these steps may be adjusted. For example, one or more of steps 2062-2067 may not be performed for step 1660. As other examples, one or more of steps 2063-2067 may be performed before step 2062; one or more of steps 2064-2067 may be performed before step 2063; one or more of steps 2065-2067 may be performed before step 2064; one or more of steps 2066 and 2067 may be performed before step 2065; step 2067 may be performed before step 2066; and/or any one or more of steps 2062-2067 may be performed in place of step 1650. Results of one or more of steps 2062-2067 may be weighted differently from results of one or more other of these steps for an overall decision relating to a handover, a multi-connectivity initiation, and/or a multi-connectivity modification.

Figure 21:
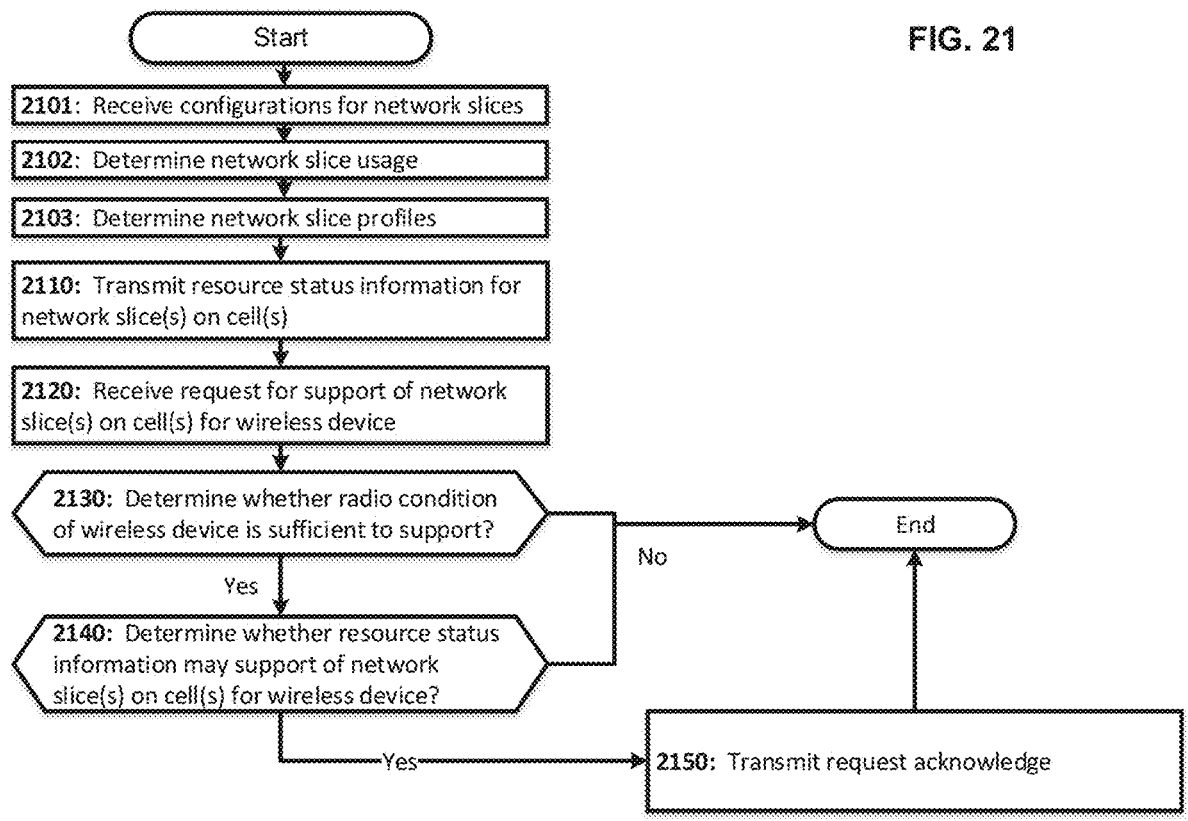
FIG. 21 shows details for determining a handover, a multi-connectivity initiation, and/or a multi-connectivity modification for a wireless device.

FIG. 21 shows an example of a procedure that may be performed for a handover, a multi-connectivity initiation, and/or a multi-connectivity modification. The following may be performed, e.g., by the second base station 1503 or any other base station, for the wireless device 1501. The procedure may begin with the second base station 1503 receiving configurations for network slices, at step 2101. Configurations for network slices may comprise information such as types of network slices available in a network, services associated with network slices, priority levels associated with network slices, access permissions associated with network slices, network resources associated with network slices, and any other information a base station may require for serving a network slice or making a decision for serving a network slice.

At step 2102, the second base station 1503 may determine network slice usage for the first cell 1504. For example, the second base station 1503 may determine the wireless devices it is serving that are using network slices, the network slices being used by those wireless devices, and/or the level of usage of the network slices by the wireless devices served by the second base station 1503, e.g., based on a PDU session and/or a QoS flow status associated with the network slices of the wireless devices. At step 2103, the second base station 1503 may use information, e.g., determined from step 1601, to determine network slice profiles. The network slice profiles may be, e.g., on a per slice basis and/or on a per wireless device basis. The network slice profiles may be used for responding to a request for a network slice by a wireless device. For example, the second base station 1503 may determine whether a wireless device may be able to obtain service for a network slice based on a network slice profile for the wireless device.

At step 2110, the second base station 1503 may transmit resource status information 1505 for one or more network slices on or associated with one or more cells or on or associated with another base station. For example, resource status information 1505 may be transmitted for a single network slice on the first cell 1504 or a plurality of network slices on the first cell 1504. Resource status information 1505 may also be transmitted for any number of network slices on any number of cells if the second base station 1503 previously received such resource status information. Resource status information 1505 for the first cell 1504 may be transmitted at any time, e.g., at a time duration, or upon or after an event (e.g., a handover, multi-connectivity activation, multi-connectivity modification, measurement report, rejection event, and/or the like). Step 2110 may conclude upon or after, e.g., resource status information 1505 for the first cell 1504 is transmitted, a response to the resource status information 1505 is received, a time duration, or the occurrence of an event (e.g., upon receipt of a measurement report from a wireless device, or any other event upon which a handover or a multi-connectivity decision may be based).

At step 2120, the second base station 1503 may receive a request for support of one or more network slices in one or more cells for the wireless device. The request received at step 2120 may comprise the request 1512 described above regarding FIG. 15 or any other request.

At step 2130, the second base station 1503 may determine whether one or more radio conditions for the wireless device are sufficient for the second base station 1503 to support the wireless device 1501. Step 2130 may comprise one or more steps of FIG. 18, descriptions of which are incorporated by reference here. For example, if radio conditions for the first cell 1504 indicate that first cell 1504 is insufficient, or likely to be insufficient, for serving a network slice for the wireless device 1501, then the second base station 1503 may determine not to proceed with a request from the first base station 1502 for serving the network slice, and the procedure may end. If, however, radio conditions for the first cell 1504 indicate that the first cell 1504 is sufficient, or is likely to be sufficient, for serving a network slice for the wireless device 1501, then the second base station 1503 may proceed to step 2140.

At step 2140, the second base station 1503 may determine whether resource status information 1505 may support one or more network slices on one or more cells for the wireless device 1501. The resource status information 1505 may provide the second base station 1503 with one or more indications of the capacity of one or more network slices, such as the capacity for a first network slice 1508 and/or the capacity for a second network slice 1509, which may be served by the second base station 1503. Additionally or alternatively, the resource status information 1505 may provide the second base station 1503 with one or more indications of the resource usage of one or more network slices, such as the resource usage for a first network slice 1506 and/or the resource usage for a second network slice 1507, which may be served by the second base station 1503. If the resource status information 1505 indicates that resources associated with the second base station 1503 for a requested network slice are insufficient, or likely to be insufficient, for serving the requested network slice for the wireless device 1501, then the procedure may end. If, however, the resource status information indicates that resources associated with the second base station 1503 for a requested network slice are sufficient, or are likely to be sufficient, then the second base station 1503 may proceed to step 2150.

At step 2150, the second base station 1503 may transmit, to the first base station 1502, a request acknowledge for the wireless device 1501. The request acknowledge may correspond to the request acknowledge 1513 described above regarding FIG. 15 or any other request acknowledge. The request acknowledge 1513 may comprise, e.g., a handover request acknowledge, a multi-connectivity initiation request acknowledge, and/or a multi-connectivity modification request acknowledge. A successful procedure may result in the first base station 1502 receiving the request acknowledgement 1513, followed by a handover, a multi-connectivity initiation, and/or a multi-connectivity addition for the second base station 1503 to serve one or more network slices for the wireless device 1501.

Any base station may perform any combination of one or more of the above steps of FIG. 21. A wireless device, a core network device, or any other device, may perform any combination of a step, or a complementary step, of one or more of the above steps. Some or all of these steps may be performed, and the order of these steps may be adjusted. For example, one or more of steps 2130 and 2140 may not be performed for a request 1512 and/or a request acknowledge 1513. As another example, step 2140 may be performed before step 2130. Results of one or more of steps 2130 and 2140 may be weighted differently from results of one or more other of these steps for an overall decision relating to a handover, a multi-connectivity initiation, and/or a multi-connectivity modification.

Figure 22:
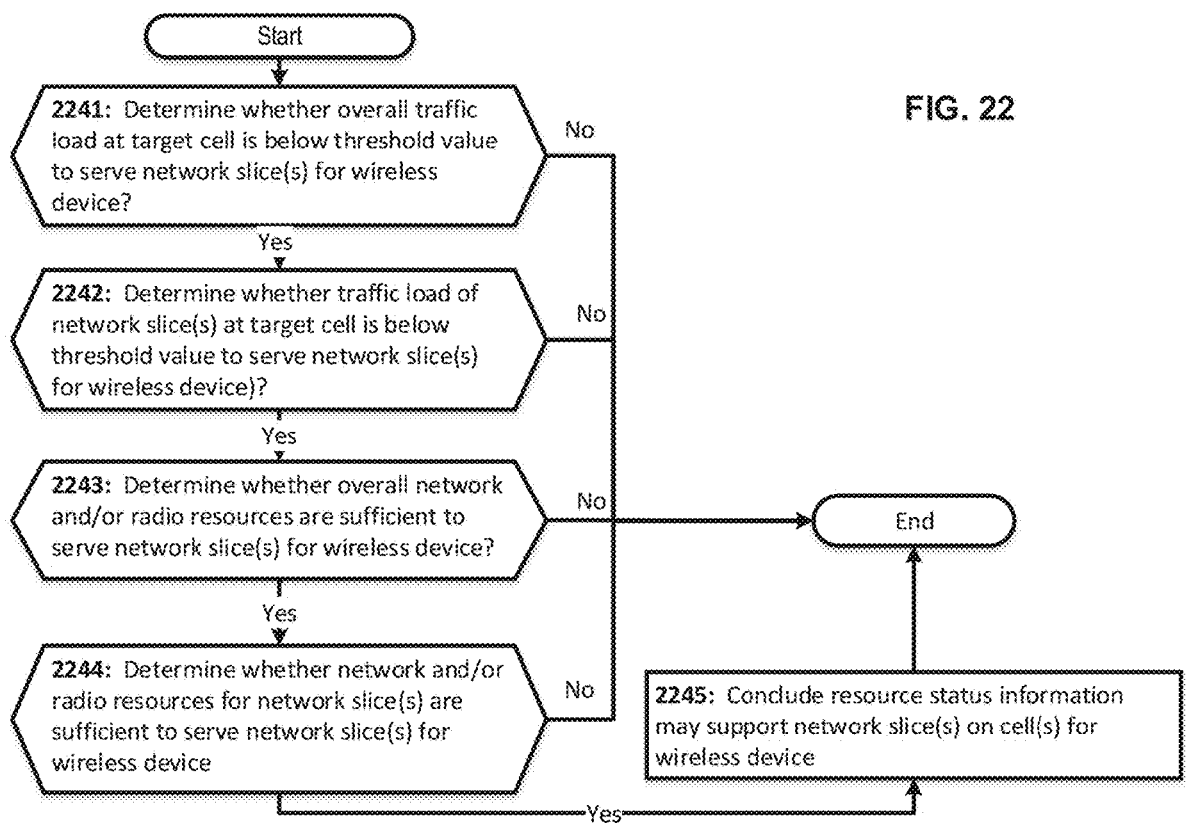
FIG. 22 shows additional details for determining a handover, a multi-connectivity initiation, and/or a multi-connectivity modification.

FIG. 22 shows additional details that may be performed, e.g., as part of step 2140 described above with respect to FIG. 21, to determine whether resource status information may support one or more network slices on one or more cells for the wireless device 1501, e.g., for a handover, a multi-connectivity initiation, and/or a multi-connectivity modification for the wireless device 1501. At step 2241, the second base station 1503 may determine whether overall traffic load at the target cell (e.g., the first cell 1504) of the second base station 1503 is below a threshold value to serve one or more network slices for the wireless device 1501. The second base station 1503 may make this determination based on, e.g., one or more load indicators that may be included in the resource status information 1505 (e.g., at step 2110). If the second base station 1503 determines that the overall traffic load at the target cell of the second base station 1503 is not below the threshold value to serve one or more network slices for the wireless device 1501, the second base station 1503 may not be able to serve the one or more network slices for the wireless device 1501 and the process may end. If, however, the second base station 1503 determines that the overall traffic load at the target cell of the second base station 1503 is below the threshold value to serve one or more network slices for the wireless device 1501, the process may continue to step 2242.

At step 2242, the second base station 1503 may determine whether the traffic load of one or more network slices at the target cell of the second base station 1503 is below a threshold value. If the traffic load of one or more network slices at the target cell of the second base station 1503 is not below the threshold value, the second base station 1503 may not be able to serve the one or more network slices for the wireless device 1501 and the process may end. If, however, the second base station 1503 determines that the traffic load of one or more network slices at the target cell of the second base station 1503 is below the threshold value, the process may continue to step 2243.

At step 2243, the second base station 1503 may determine whether current overall network and/or radio resources are sufficient to serve one or more network slices for the wireless device 1501. If current overall network and/or radio resources for one or more network slices are insufficient to serve one or more network slices for the wireless device 1501, the second base station 1503 may not be able to serve the one or more network slices for the wireless device 1501 and the process may end. If, however, the second base station 1503 determines that current overall network and/or radio resources for one or more network slices are sufficient to serve one or more network slices for the wireless device 1501, the process may continue to step 2244.

At step 2244, the second base station 1503 may determine whether current network and/or radio resources for one or more network slices are sufficient to serve one or more network slices for the wireless device 1501. If current network and/or radio resources for one or more network slices are insufficient to serve one or more network slices for the wireless device 1501, the second base station 1503 may not be able to serve the one or more network slices for the wireless device 1501 and the process may end. If, however, the second base station 1503 determines that current network and/or radio resources for one or more network slices are sufficient to serve one or more network slices for the wireless device 1501, the second base station 1503 may conclude, at step 2245, that the resource status information may support one or more network slices for the wireless device 1501, and the procedure of FIG. 22 may end by returning to step 2150 in FIG. 21 described above.

Any base station may perform any combination of one or more of the above steps of FIG. 22. A wireless device, a core network device, or any other device, may perform any combination of a step, or a complementary step, of one or more of the above steps. Some or all of these steps may be performed, and the order of these steps may be adjusted. For example, one or more of steps 2241, 2242, 2243, and 2244 may not be performed for step 2140. As other examples, step 2242, step 2243, and/or step 2244 may be performed before step 2241; step 2243 and/or step 2244 may be performed before step 2242; step 2244 may be performed before step 2243; and/or any one or more of steps 2241-2244 may be replaced by step 2150. Results of one or more of steps 2241, 2242, 2243, and 2244 may be weighted differently from results of one or more other of these steps for an overall decision relating to a handover, a multi-connectivity initiation, and/or a multi-connectivity modification.

Figure 23:
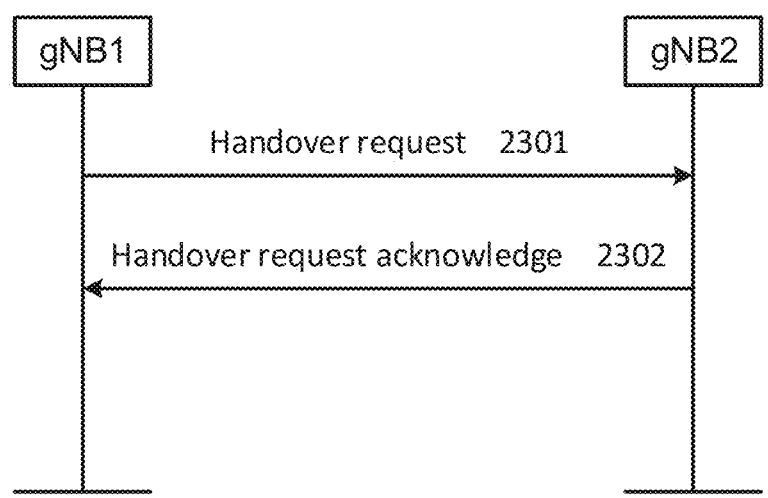
FIG. 23 shows an example of a handover procedure via a direct interface.

FIG. 23 shows an example of a handover procedure, e.g., via a direct interface, such as an Xn interface. The handover procedure shown in FIG. 23 may be performed as part of the request 1512 and request acknowledge 1513 described above regarding FIG. 15. A first base station (e.g., gNB1 or first base station 1502) may send a handover request 2301 (e.g., request 1512) to a second base station (e.g., gNB2 or second base station 1503). The second base station may respond to the handover request 2301 by sending a handover request acknowledge 2302 (e.g., request acknowledge 1513). Based on the handover request acknowledge 2302, gNB1 may proceed with a handover of a wireless device (e.g., wireless device 1501) from gNB1 to gNB2.

Figure 24:
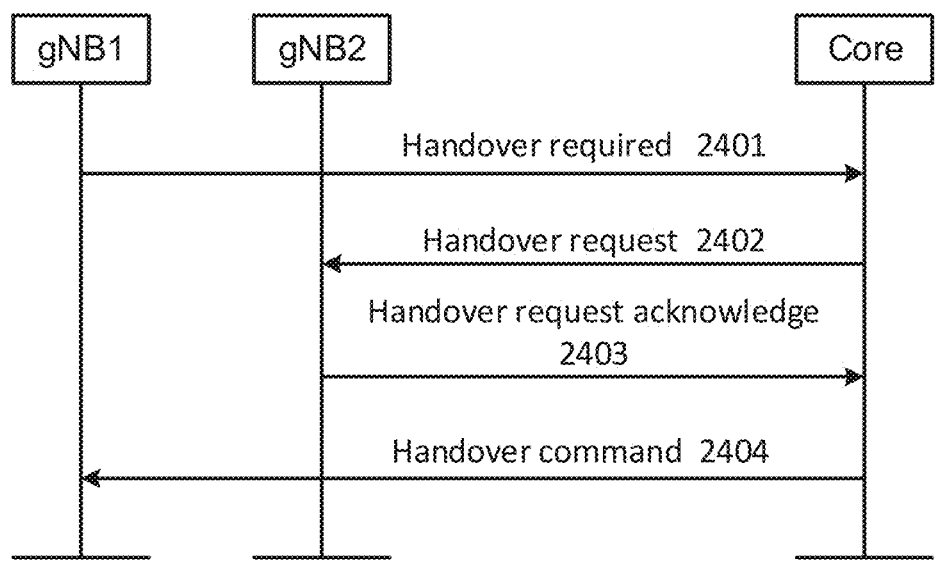
FIG. 24 shows an example of a handover procedure via an indirect interface.

FIG. 24 shows an example of a handover procedure, e.g., via an indirect interface, such as an NG interface. The handover procedure shown in FIG. 24 may be performed as part of the request 1512 and request acknowledge 1513 described above regarding FIG. 15. A first base station (e.g., gNB1 or the first base station 1502) may send a handover required message 2401 (e.g., request 1512). A third device (e.g., an AMF device, an MME (mobility management entity) device, any core network device, or any other device) may receive the handover required message 2401. The third device may send a handover request 2402 (e.g., request 1512) to a second base station (e.g., gNB2 or the second base station 1503). The gNB2 may respond to the handover request 2402 by sending a handover request acknowledge 2403 (e.g., request acknowledge 1513). The third device may send a handover command 2404 to the gNB1, e.g., in response to the handover request acknowledge 2403. Based on the handover command 2204, the gNB1 may proceed with a handover of a wireless device (e.g., wireless device 1501) from gNB1 to gNB2.

Figure 25:
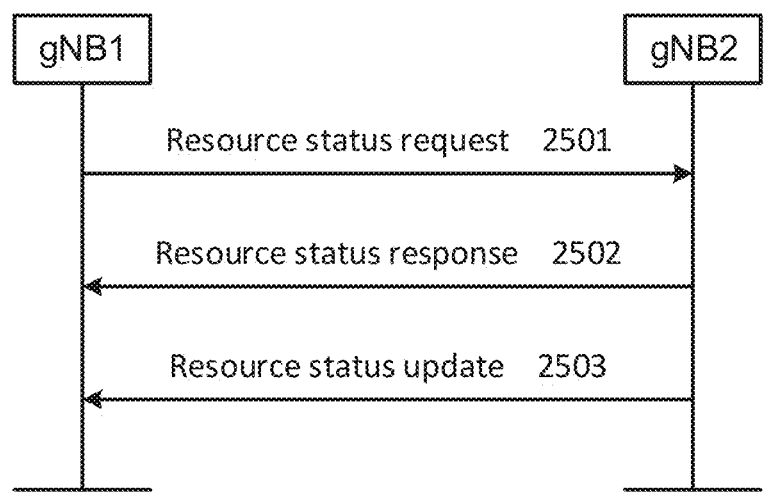
FIG. 25 shows an example of a resource status update procedure.

FIG. 25 shows an example of a resource status update procedure. A first base station (e.g., gNB1 or the first base station 1502) may transmit, to a second base station (e.g., gNB2 or the second base station 1503), a resource status request message 2501. The resource status request message may comprise, e.g., the cell identifier of the first cell 1504 and one or more first slice identifiers of the one or more slices (e.g., S-NSSAI, NSSAI, and/or the like) of first network slice(s) served via the second base station 1503 and/or via the first cell 1504, a reporting periodicity information, and/or the like. The reporting periodicity information may indicate a time duration, and the second base station 1503 receiving the time duration may periodically report a resource status information 1505 to the first base station 1502 if the time duration expires (e.g., at each time duration). The resource status request message 2501 may be configured to request one or more elements of the resource status information 1505. The resource status request message 2501 may request a resource status information of a first cell for one or more first network slices.

The first base station (e.g., gNB1 or the first base station 1502) may receive, from the second base station (e.g., gNB2 or the second base station 1503), a resource status response message 2502 in response to the resource status request message 2502. The resource status response message 2502 may comprise one or more of: a network slice identifier of an accepted network slice; a network slice identifier of a rejected network slice; a slice reject cause value indicating that a traffic load of one or more slices is high (e.g., exceeds a threshold); a handover reject cause value indicating that a traffic load of one or more slices is high (e.g., exceeds a threshold); an information element indicating that a traffic load of one or more slices is high (e.g., exceeds a threshold); a multi-connectivity (including, e.g., dual-connectivity) reject cause value indicating that a traffic load of one or more slices is high (e.g., exceeds a threshold); and/or the like. The resource status response message 2502 may indicate, e.g., whether the resource status measurement for the first cell is initiated or failed.

The first base station (e.g., gNB1 or the first base station 1502) may receive, from the second base station (e.g., gNB2 or the second base station 1503), a resource status update message 2503. The resource status update message 2503 may comprise, e.g., one or more of: a resource status information for the first cell 1504, the second base station 1503, an uplink transmission, a downlink transmission, an uplink and downlink transmission, first network slice(s) served via the second base station 1503 and/or the first cell 1504, a cell identifier of the first cell 1504, first network slice identifier(s) for the one or more first network slices, and/or the like. The resource status information may comprise, e.g., one or more of a radio resource status, an F1 interface load indicator, a hardware load indicator, an NG interface load indicator (e.g., a load indicator for an interface between the second base station and a core network entity), a composite available capacity group, a network slice overload indicator, and/or the like.

Figure 26:
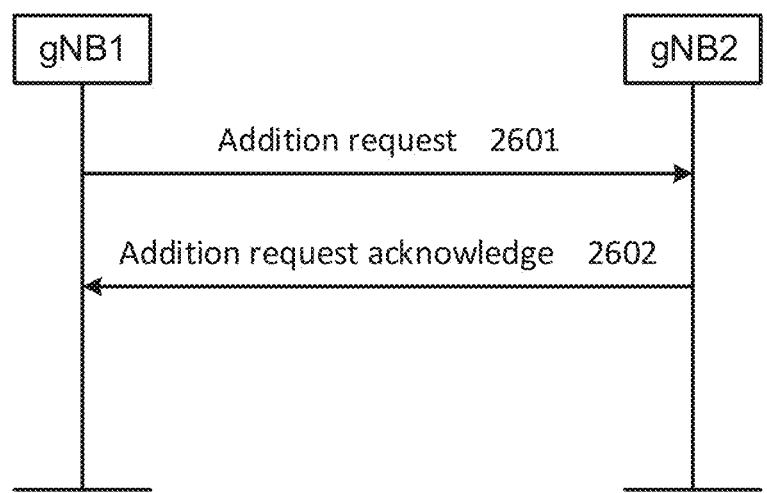
FIG. 26 shows an example of an addition procedure.

FIG. 26 shows an example for an initiation and/or addition procedure. For example, the first base station 1502 may make a decision (e.g., the decision 1511) on a multi-connectivity initiation (including, e.g., a dual connectivity initiation) for the wireless device 1501. The decision on a multi-connectivity initiation may be based on one or more elements of the resource status information 1505. The wireless device 1501 may report a measurement result (e.g., in the measurement report 1510) for the first cell 1504 of the second base station 1503. The wireless device 1501 may employ one or more of the first network slices and/or a service associated with one or more of the first network slices. The first base station 1502 may make a decision on a multi-connectivity initiation of the wireless device 1501 based on one or more elements of the resource status information 1505, the measurement result (e.g., in the measurement report 1510), one or more network slices served to the wireless device 1501, and/or one or more services served to the wireless device 1501.

After and/or in response to the decision on the multi connectivity initiation of the wireless device 1501, the first base station 1502 may transmit, to the second base station 1503, an addition request message 2601 configured to request a multi-connectivity initiation (including, e.g., a dual connectivity initiation) for the wireless device 1501. The addition request message 2601 may comprise an SgNB addition request message. The addition request message 2601 may comprise, e.g., a cell identifier of the first cell 1504, a wireless device identifier of the wireless device 1501, one or more network slice identifiers of one or more network slices served to the wireless device 1501, one or more packet flow identifiers of one or more packet flows (e.g., bearers) associated with the one or more network slices served to the wireless device 1501, and/or the like.

After and/or in response to the addition request message 2601, the first base station 1502 may receive, from the second base station 1503, an addition request acknowledge message 2602 configured to respond to the multi-connectivity request of the addition request message 2601. The addition request acknowledge message 2602 may comprise an SgNB addition request acknowledge message. The addition request acknowledge message 2602 may comprise, e.g., one or more network slice identifiers of one or more accepted network slices, one or more network slice identifiers of one or more rejected network slices, a slice reject cause value indicating that a load of one or more slices is high and/or overloaded, a multi connectivity reject cause value indicating that a traffic load of one or more slices is high and/or overloaded, and/or the like. After and/or in response to the addition request acknowledge message 2602, the first base station 1502 may transmit a radio resource control reconfiguration message to the wireless device 1501. The radio resource control reconfiguration message may be based on one or more elements of the addition request acknowledge message 2602.

Figure 27:
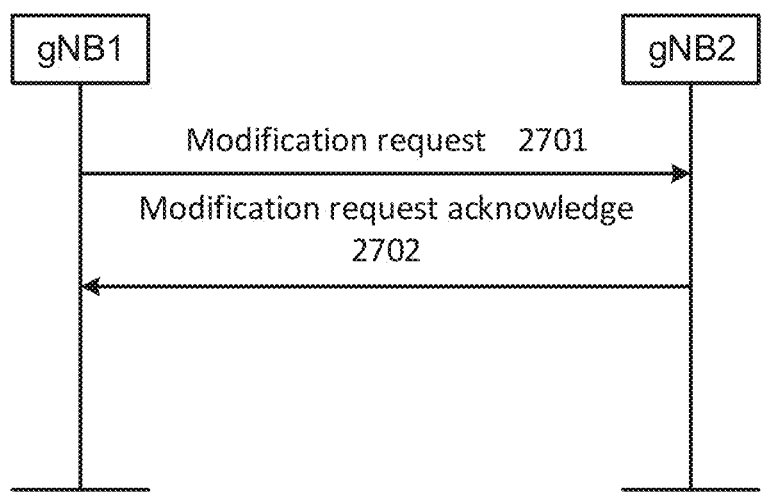
FIG. 27 shows an example of a modification procedure.

FIG. 27 shows an example for a modification procedure. The first base station 1502 may make a decision (e.g., the decision 1511) on a multi-connectivity modification (including, e.g., a dual-connectivity modification) for a wireless device 1501. The decision on a multi-connectivity modification may be based on one or more elements of the resource status information 1505. The wireless device 1501 may report a measurement result (e.g., in the measurement report 1510) for the first cell 1504 of the second base station 1503. The wireless device 1501 may employ one or more of the first network slices and/or a service associated with one or more of the first network slices. The first base station 1502 may make a decision on a multi-connectivity modification of the wireless device 1501. The multi-connectivity modification may be based on, e.g., one or more elements of the resource status information 1505, the measurement result (e.g., in the measurement report 1510), one or more network slices served to the wireless device 1501, and/or one or more services served to the wireless device 1501.

After and/or in response to the decision on the multi-connectivity modification of the wireless device 1501, the first base station 1502 may transmit, to the second base station 1503, a modification request message 2701 configured to request a multi-connectivity modification (including, e.g., dual connectivity modification) for the wireless device 1501. The modification request message 2701 may comprise an SgNB modification request message. The modification request message 2701 may comprise, e.g., a cell identifier of the first cell 1504, a wireless device identifier of the wireless device 1501, one or more network slice identifiers of one or more network slices served to the wireless device 1501, one or more packet flow identifiers of one or more packet flows (e.g., bearers) associated with the one or more network slices served to the wireless device 1501, and/or the like.

After and/or in response to the modification request message 2702, the first base station 1502 may receive, from the second base station 1503, a modification request acknowledge message 2702 configured to respond to the multi-connectivity modification request of the modification request message 2701. The modification request acknowledge message 2702 may comprise an SgNB modification request acknowledge message. The modification request acknowledge message 2702 may comprise, e.g., one or more network slice identifiers of one or more accepted network slices, one or more network slice identifiers of one or more rejected network slices, a slice reject cause value indicating that a load of one or more slices is high and/or overloaded (e.g., exceeds a threshold), a dual multi connectivity modification reject cause value indicating that a traffic load of one or more slices is high and/or overloaded (e.g., exceeds a threshold), and/or the like. After receiving and/or in response to the modification request acknowledge message 2702, the first base station 1502 may transmit a radio resource control reconfiguration message to the wireless device 1501. The radio resource control reconfiguration message may be based on one or more elements of the modification request acknowledge message 2702.

A base station may perform any combination of one or more of the above steps. A wireless device, or any other device, may perform any combination of a step, or a complementary step, of one or more of the above steps. Any base station described herein may be a current base station, a serving base station, a source base station, a target base station, or any other base station.

Figure 28:
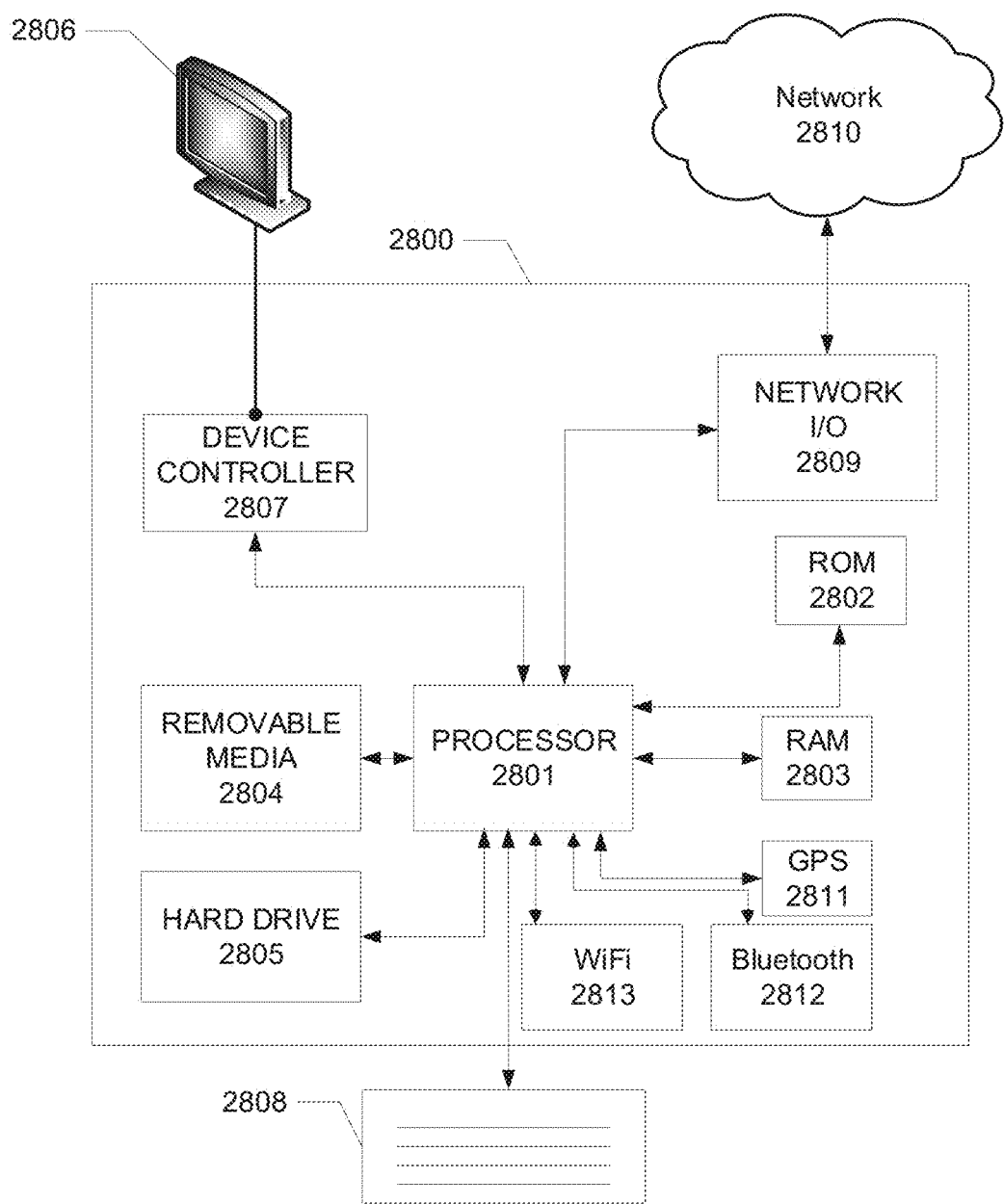
FIG. 28 shows example elements of a computing device.

FIG. 28 shows general hardware elements that may be used to implement any of the various computing devices discussed herein, including, e.g., the base station 401, the first base station 1502, the second base station 1503, the wireless device 406, the wireless device 1501, or any other base station, wireless device, or computing device. The computing device 2800 may include one or more processors 2801, which may execute instructions the random access memory (RAM) 2803, the removable media 2804, such as a Universal Serial Bus (USB) drive, compact disk (CD) or digital versatile disk (DVD), floppy disk drive, or any other desired storage medium. Instructions may also be stored in an attached (or internal) hard drive 2805. The computing device 2800 may also include a security processor (not shown), which may execute instructions of a one or more computer programs to monitor the processes executing on the processor 2801 and any process that requests access to any hardware and/or software components of the computing device 2800 (e.g., ROM 2802, RAM 2803, the removable media 2804, the hard drive 2805, the device controller 2807, a network circuit 2809, a GPS 2811, a Bluetooth 212, a WiFi 2813, etc.). The computing device 2800 may include one or more output devices, such as the display 2806 (e.g., a screen, a display device, a monitor, a television, etc.), and may include one or more output device controllers 2807, such as a video processor. There may also be one or more user input devices 2808, such as a remote control, keyboard, mouse, touch screen, microphone, etc. The computing device 2800 may also include one or more network interfaces, such as a network circuit 2809, the may be a wired interface, wireless interface, or a combination of the two. The network interface 2809 may provide an interface for the computing device 2800 to communicate with a network 2810 (e.g., a RAN, or any other network). In some embodiments, the network circuit 2809 may include a modem (e.g., a cable modem), and the external network 2800 may include communication links, an external network, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 2811, which may be configured to receive and process global positioning signals and determine, with possible assistance from an external server and antenna, a geographic position of the device.

The example in FIG. 28 is a hardware configuration, although the illustrated components may be implemented as software as well. Modifications may be made to add, remove, combine, divide, etc. components of the computing device 2800 as desired. Additionally, the components illustrated may be implemented using basic computing devices and components, and the same components (e.g., processor 2801, ROM storage 2802, display 2806, etc.) may be used to implement any of the other computing devices and components described herein. For example, the various components herein may be implemented using computing devices having components such as a processor executing computer-executable instructions stored on a computer-readable medium, as illustrated in FIG. 28. Some or all of the entities described herein may be software based, and may co-exist in a common physical platform (e.g., a requesting entity may a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. The functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
receiving, by a first base station and from a second base station, a first message comprising:
a cell identifier of a first cell of the second base station;
a first network slice identifier of a first network slice associated with the first cell; and
a first resource status information element indicating a radio resource status of the first network slice;
determining, by the first base station and based on the first resource status information element, a handover decision for a wireless device; and
sending, by the first base station, to the second base station, and based on the handover decision for the wireless device, a second message indicating a handover request for the wireless device.

2. The method of claim 1, further comprising:
receiving, by the first base station and from the wireless device, a measurement report; and
wherein the determining the handover decision for the wireless device is further based on the measurement report.

3. The method of claim 1, further comprising:
receiving, by the first base station and from a third base station, a third message comprising:
a cell identifier of a second cell of the third base station;
a second network slice identifier of a second network slice associated with the second cell; and
a second resource status information element indicating a radio resource status of the second network slice; and
wherein the determining the handover decision for the wireless device is further based on the second resource status information element.

4. The method of claim 1, wherein the first resource status information element further indicates an F1 interface load information.

5. The method of claim 1, wherein the second message comprises at least one of:
the first network slice identifier of the first network slice;
the cell identifier of the first cell of the second base station;
a wireless device identifier of the wireless device; or
a packet flow identifier of a packet flow associated with the first network slice.

6. The method of claim 1, further comprising:
sending, by the first base station and to the second base station, a third message indicating a resource status information request and comprising:
the cell identifier of the first cell of the second base station; and
the first network slice identifier of the first network slice.

7. The method of claim 1, further comprising:
receiving, by the first base station, from the second base station, and based on the second message, a third message comprising at least one of:
a first packet flow identifier of an admitted packet flow associated with the first network slice;
a second packet flow identifier of a not-admitted packet flow associated with the first network slice; or
an information element indicating that a traffic load of one or more network slices exceeds a threshold.

8. A first base station comprising:
one or more processors; and
memory storing instructions that, when executed by the one or more processors, cause the first base station to:
receive, from a second base station, a first message comprising:
a cell identifier of a first cell of the second base station;
a first network slice identifier of a first network slice associated with the first cell; and
a first resource status information element indicating a radio resource status of the first network slice;
determine, based on the first resource status information element, a handover decision for a wireless device; and send, to the second base station and based on the handover decision for the wireless device, a second message indicating a handover request for the wireless device.

9. The first base station of claim 8, wherein the instructions, when executed by the one or more processors, further cause the first base station to receive, from the wireless device, a measurement report; and
wherein the instructions that, when executed by the one or more processors, cause the first base station to determine the handover decision for the wireless device, cause the first base station to determine the handover decision for the wireless device further based on the measurement report.

10. The first base station of claim 8, wherein the instructions, when executed by the one or more processors, further cause the first base station to receive, from a third base station, a third message comprising:
a cell identifier of a second cell of the third base station;
a second network slice identifier of a second network slice associated with the second cell; and
a second resource status information element indicating a radio resource status of the second network slice; and
wherein the instructions that, when executed by the one or more processors, cause the first base station to determine the handover decision for the wireless device, cause the first base station to determine the handover decision for the wireless device further based on the second resource status information element.

11. The first base station of claim 8, wherein the first resource status information element further indicates an F1 interface load information.

12. The first base station of claim 8, wherein the second message comprises at least one of:
the first network slice identifier of the first network slice;
the cell identifier of the first cell of the second base station;
a wireless device identifier of the wireless device; or
a packet flow identifier of a packet flow associated with the first network slice.

13. The first base station of claim 8, wherein the instructions, when executed by the one or more processors, further cause the first base station to:
send, to the second base station, a third message indicating a resource status information request and comprising:
the cell identifier of the first cell of the second base station; and
the first network slice identifier of the first network slice.

14. The first base station of claim 8, wherein the instructions, when executed by the one or more processors, further cause the first base station to:
receive, from the second base station and based on the second message, a third message comprising at least one of:
a first packet flow identifier of an admitted packet flow associated with the first network slice;
a second packet flow identifier of a not-admitted packet flow associated with the first network slice; or
an information element indicating that a traffic load of one or more network slices exceeds a threshold.

15. A method comprising:
sending, by a first base station and to a second base station, a first message comprising:
a cell identifier of a first cell of the first base station;
a first network slice identifier of a first network slice associated with the first cell; and
a first resource status information element indicating a radio resource status of the first network slice;
receiving, by the first base station, from the second base station, and based on the first message, a second message indicating a handover request for a wireless device;
determining, by the first base station and based on one or more resources associated with the first network slice, to perform a handover for the wireless device; and
sending, by the first base station and to the second base station, a response message indicating acceptance of the handover request for the wireless device.

16. The method of claim 15, wherein the first resource status information element further indicates an F1 interface load information.

17. The method of claim 15, wherein the second message comprises at least one of:
the first network slice identifier of the first network slice;
the cell identifier of the first cell of the first base station;
a wireless device identifier of the wireless device; or
a packet flow identifier of a packet flow associated with the first network slice.

18. The method of claim 15, further comprising:
receiving, by the first base station and from the second base station, a third message indicating a resource status information request and comprising:
the cell identifier of the first cell of the first base station; and
the first network slice identifier of the first network slice.

19. The method of claim 15, wherein the response message comprises at least one of:
a first packet flow identifier of an admitted packet flow associated with the first network slice;
a second packet flow identifier of a not-admitted packet flow associated with the first network slice; or
an information element indicating that a traffic load of one or more network slices exceeds a threshold.

20. The method of claim 15, wherein the first network slice identifier of the first network slice comprises one or more of a network slice selection assistance information.

21. A first base station comprising:
one or more processors; and
memory storing instructions that, when executed by the one or more processors, cause the first base station to:
send, to a second base station, a first message comprising:
a cell identifier of a first cell of the first base station;
a first network slice identifier of a first network slice associated with the first cell; and
a first resource status information element indicating a radio resource status of the first network slice;
receive, from the second base station, and based on the first message, a second message indicating a handover request for a wireless device;
determine, based on one or more resources associated with the first network slice, to perform a handover for the wireless device; and
send, to the second base station, a response message indicating acceptance of the handover request for the wireless device.

22. The first base station of claim 21, wherein the first resource status information element further indicates an F1 interface load information.

23. The first base station of claim 21, wherein the second message comprises at least one of:
the first network slice identifier of the first network slice;
the cell identifier of the first cell of the first base station;
a wireless device identifier of the wireless device; or
a packet flow identifier of a packet flow associated with the first network slice.

24. The first base station of claim 21, wherein the instructions, when executed by the one or more processors, further cause the first base station to:
receive, from the second base station, a third message indicating a resource status information request and comprising:
the cell identifier of the first cell of the first base station; and
the first network slice identifier of the first network slice.

25. The first base station of claim 21, wherein the response message comprises at least one of:
a first packet flow identifier of an admitted packet flow associated with the first network slice;
a second packet flow identifier of a not-admitted packet flow associated with the first network slice; or
an information element indicating that a traffic load of one or more network slices exceeds a threshold.

26. The first base station of claim 21, wherein the first network slice identifier of the first network slice comprises one or more of a network slice selection assistance information.

* * * * *

UNITED STATES PATENT AND TRADEMARK OFFICE
CERTIFICATE OF CORRECTION

PATENT NO. : 10,582,432 B2
APPLICATION NO. : 15/971815
DATED : March 3, 2020
INVENTOR(S) : Kyungmin Park et al.

It is certified that error appears in the above-identified patent and that said Letters Patent is hereby corrected as shown below:

In the Specification

Detailed Description, Column 10, Line 10:
Please delete "RAN/SGC;" and insert --RAN/5GC;--

Detailed Description, Column 13, Line 10:
Delete "621" and insert --620--

Detailed Description, Column 20, Line 65:
Delete "1312, 1312," and insert --1312, 1313,--

Signed and Sealed this
Fifteenth Day of November, 2022

Katherine Kelly Vidal
*Director of the United States Patent and Trademark Office*